US012719900B2

(12) United States Patent
Mamaev et al.

(10) Patent No.: US 12,719,900 B2
(45) Date of Patent: Aug. 25, 2026

(54) SYSTEM AND METHOD FOR DETECTING ANOMALIES IN A CYBER-PHYSICAL SYSTEM IN REAL TIME

(71) Applicant: AO Kaspersky Lab, Moscow (RU)

(72) Inventors: Maxim A. Mamaev, Moscow (RU); Alexander V. Travov, Moscow (RU); Andrey B. Lavrentyev, Moscow (RU)

(73) Assignee: AO Kaspersky Lab, Moscow (RU)

( * ) Notice: Subject to any disclaimer, the term of this patent is extended or adjusted under 35 U.S.C. 154(b) by 34 days.

(21) Appl. No.: 18/618,334

(22) Filed: Mar. 27, 2024

(65) Prior Publication Data

US 2024/0333742 A1 Oct. 3, 2024

(30) Foreign Application Priority Data

Mar. 27, 2023 (RU) ........................... RU2023107218

(51) Int. Cl.
*H04L 29/06* (2006.01)
*H04L 9/40* (2022.01)

(52) U.S. Cl.
CPC ................................ *H04L 63/1425* (2013.01)

(58) Field of Classification Search
CPC .................................................. H04L 63/1425
See application file for complete search history.

(56) References Cited

U.S. PATENT DOCUMENTS 11,128,648 B2 * 9/2021 Amirmazlaghani ........................ H04L 63/1408
11,175,976 B2 11/2021 Lavrentyev et al.
11,494,252 B2 11/2022 Lavrentyev et al.
2017/0046518 A1 * 2/2017 Chen ..................... G06F 21/566
2023/0115935 A1 * 4/2023 Wahbo ................ H04L 63/1425 726/23
2023/0199024 A1 * 6/2023 Dods ....................... H04L 63/20 726/23
2023/0396633 A1 * 12/2023 Li ....................... H04L 63/1425

FOREIGN PATENT DOCUMENTS

RU 2749252 C1 6/2021
RU 2790331 C1 3/2022

OTHER PUBLICATIONS

A. Putina and D. Rossi, "Online Anomaly Detection Leveraging Stream-Based Clustering and Real-Time Telemetry," in IEEE Transactions on Network and Service Management, vol. 18, No. 1, pp. 839-854, Mar. 2021, doi: 10.1109/TNSM.2020.3037019. (Year: 2021).*

* cited by examiner

*Primary Examiner* — Ka Shan Choy
(74) *Attorney, Agent, or Firm* — ArentFox Schiff LLP; Michael Fainberg

(57) ABSTRACT

Disclosed herein are systems and methods for detection of anomalies in a cyber-physical system in real-time. In one aspect, an exemplary method comprises: obtaining, in real-time, randomly distributed stream of observations of CPS parameters; converting an observation of the CPS parameter to a uniform temporal grid (UTG); when at least a criterion for unloading at least one UTG node of the converted observations is satisfied, unloading the UTG nodes corresponding to the satisfied criterion; for each unloaded UTG node, calculating a value of each output CPS parameter of a set of output CPS parameters; and detecting an anomaly in the CPS based on the values of the output CPS parameters.

22 Claims, 20 Drawing Sheets

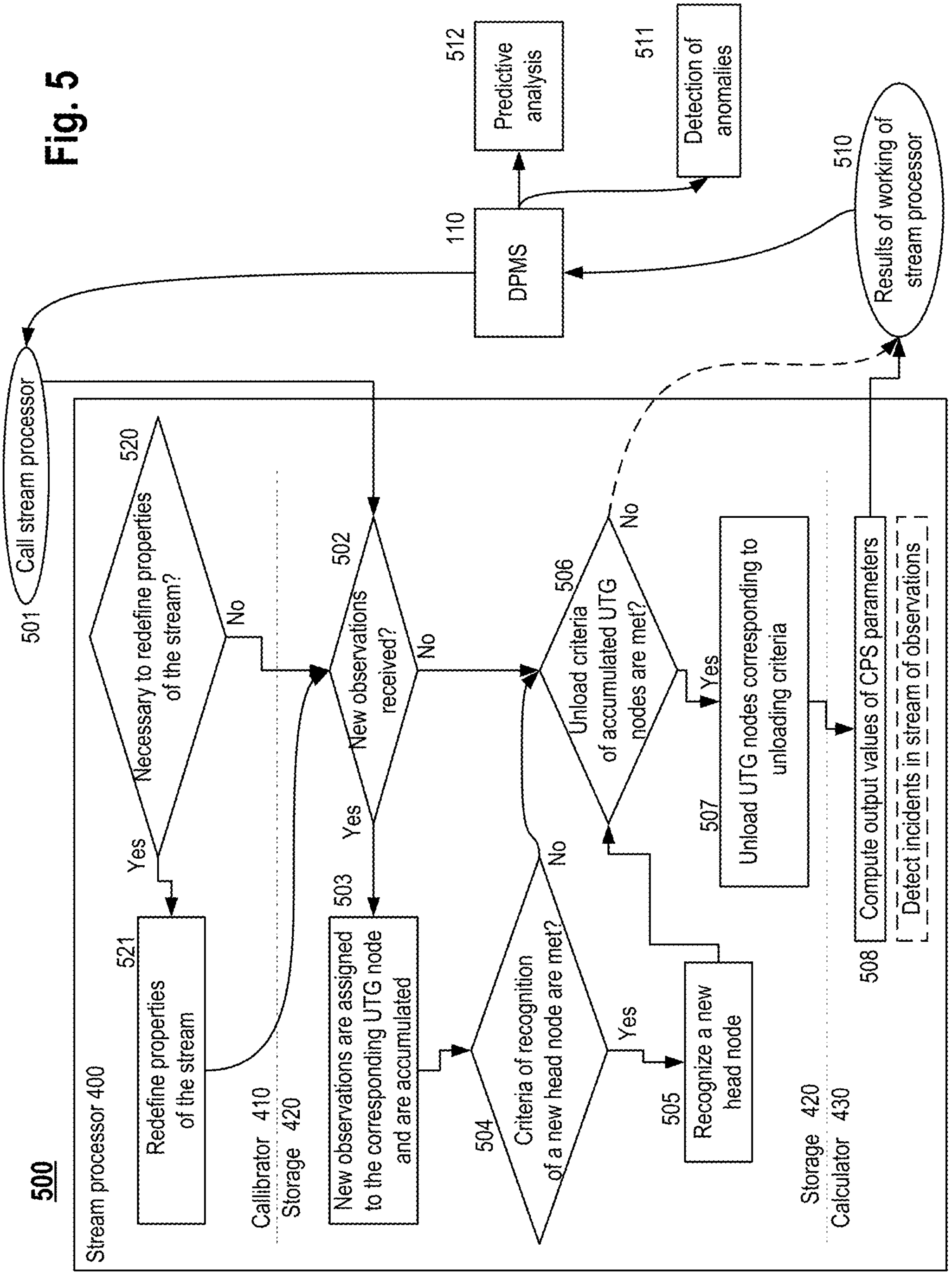
Fig. 5
500
Stream processor 400
Callibrator 410
Storage 420
Storage 420
Calculator 430
501
Call stream processor
520
Necessary to redefine properties of the stream?
Yes
No
521
Redefine properties of the stream
502
New observations received?
Yes
No
503
New observations are assigned to the corresponding UTG node and are accumulated
504
Criteria of recognition of a new head node are met?
Yes
No
505
Recognize a new head node
506
Unload criteria of accumulated UTG nodes are met?
Yes
No
507
Unload UTG nodes corresponding to unloading criteria
508
Compute output values of CPS parameters
Detect incidents in stream of observations
510
Results of working of stream processor
110
DPMS
512
Predictive analysis
511
Detection of anomalies

600

700

SYSTEM AND METHOD FOR DETECTING ANOMALIES IN A CYBER-PHYSICAL SYSTEM IN REAL TIME

CROSS REFERENCE TO RELATED APPLICATIONS

The present application claims priority to Russian Patent Application No. 2023107218, filed on Mar. 27, 2023, the entire content of which is incorporated herein by reference.

FIELD OF TECHNOLOGY

The present disclosure relates to the field of information technology and information management systems, including information and industrial security, and more specifically to systems and methods for detecting anomalies in a cyber-physical system in real time.

BACKGROUND

The operation of modern enterprises is provided by cyber-physical systems (CPS) with thousands of sensors, actuators, PID controllers (proportional integral derivative controller), PLC (programmable logic controller), as well as information systems (IS) with many computing devices in the network. Therefore, such enterprises also install various monitoring systems designed to monitor and analyze enterprise data.

The CPS or IS may also be referred to as the object of monitoring (hereinafter referred to as the "object"). Thus, objects of monitoring are characterized by presence of a data stream characterizing operations of these objects. Such data serves as an important subject of analysis both in real-time (e.g., online) and retrospectively based on the collected data. The analysis is performed to detect anomalies (deviations from the normal operation of the object) as well as to form predictions about a future state of the object.

Predictive models based on neural networks and other machine learning methods (classification, clustering, regression methods, etc.) are successfully used to analyze telemetry data of physical processes (i.e., values of CPS parameters, such as sensor readings, setpoint values, control action levels, hereinafter referred to as telemetry), as well as anomaly detectors (detectors), as well as predictive analyzers. This telemetry analysis can be performed, for example, to detect anomalies or to predict the behavior of an object in the future.

The mathematical basis of most machine learning methods, including methods based on neural networks, is to reconstruct an unknown continuous function describing the operation of an object from an array of discrete observations made on the object. However, in practice, and especially in cases where the anomaly detector must work in real-time, various problems arise, for which special methods of streaming data processing are used.

For neural network-based models, the mathematical models run on a time series (for example, telemetry data), based on neighboring observations that are spaced apart by the same amount of time. When a neural network analyzes a time series, it usually considers not just one observation at a time, but many observations at a time interval (the so-called "window"). Working with a given time interval (the window) is necessary to perceive the dynamics of the process unfolding in time. After analyzing the behavior of the object in the window, the neural network produces results of the analysis, for example, predictions of the future behavior of the object or a classification of the current behavior of the object. Next, the window is moved forward by a specified step and the process is repeated for a new period of time. Adjacent windows may not overlap, or partially overlap. During training, the neural network goes through windows sequentially (i.e., the time intervals or windows are received at the input of the neural network one by one) over a long period of time in order to "understand" all the details and hidden rules of how the object functions. In inference mode, the neural network analyzes one window at a time in real-time and produces a result based on its "knowledge" gained during training.

In order for a neural network to work as described above and demonstrate consistent quality, all windows in both training and production mode must provide the same "overview" of the monitored object. This means that all windows must be the same time intervals, divided by the same number of moments at which the object is observed, and at each such moment the object is observed in the same way. It follows that the object telemetry coming into the input of the machine learning model should be represented by observations taken at the nodes of some uniform temporal grid (UTG), with values of all input parameters known at each node.

However, as a rule, there is no situation in which incoming observations are already distributed among the UTG nodes. Instead, the detector encounters one or more of the following features of the data (observation) stream:

- observations of CPS parameters are received at arbitrary intervals that do not coincide with the UTG period;
- observations of some CPS parameters are formed frequently, others rarely, and still others sporadically (upon the fact of a certain event);
- even if the proper periods of observations of different CPS parameters coincide, their phases (specific moments of measurements) are different;
- observations may be late or arrive earlier relative to neighboring observations, in other words, the timestamp of a new observation taken by the detector may be in the past relative to the timestamp of the previous observed received. This can be caused by fluctuations in the load on the processors of the monitoring system, variations in delays in the data transmission network, or a difference in the clock readings that form observations on the side of the monitored object;
- some observations are lost during transmission or are not formed at all due to overload of the monitoring system and/or due to hardware problems that arise in the processes of CPS operation; and
- from time to time, the data flow may be interrupted completely or partially, including normally (scheduled and periodic shutdown of the unit).

Thus, in general, observations are received chaotically, e.g., they are generated at random intervals, arrive in random order, are out of sync with each other and with the UTG, and are delayed or lost en route. For example, for UTG with a period of 10 seconds. The neural network expects to obtain the values of the parameters CPS "A", "B" and "C" at 12:00:00, then at 12:00:10, then at 12:00:20, etc. In fact, measurements of the values of the CPS parameter "A" can be taken at 12:00:01, 12:00:09, 12:00:21. Measurements of the CPS "B" parameter are at 11:59:48 and 12:00:08, while the latter was late and was obtained after the value of the CPS parameter "A" from 12:00:21 was received. Observations of the CPS "C" parameter were last received at 11:30 a.m. When working with such a flow of observations, the results of the detectors that rely on the uniform and synchronous receipt of measurements of the parameters "A", "B", "C" will be erroneous, and the results of the predictive analyzers will be insufficiently accurate.

Therefore, a technical problem arises, the solution of which is aimed at the declared technical solution, which consists in the creation of a computer-implemented method for detecting anomalies in a cyber-physical system in real time.

One approach is based on analysis of static data by gathering observations of various historical data which is previously collected in its entirety into a static array, wherein the gathered data covers the entire time interval to be analyzed. However, such methods are not applicable to a stream of real-time observations, where future observations and the times of their arrival are unknown. In particular, when receiving a stream, it is not known whether all observations for a particular UTG node have already been received by now, or whether some have not yet been received, or whether another part of the observations will never be received because these observations have either not been made at the site or have been lost. When working with a static data array, there is no such problem in principle, since the data processor has access to all the received observations for all UTG nodes immediately and simultaneously. In addition, when bringing a static array of data to the UTG, there is no need to identify and process late or too early arrived observations, to identify "loss of flow", to adapt to changes in the speed of data time passage relative to the processing time.

Thus, the known technologies have drawbacks that prevent them from being effective for detecting anomalies in a cyber-physical system in real-time.

Therefore, there is a need for a method and a system for improving detection of anomalies in a cyber-physical system in real-time.

SUMMARY

Aspects of the disclosure relate to systems and methods for detection of anomalies in a cyber-physical system in real-time.

In one exemplary aspect, a method for detection of anomalies in a cyber-physical system in real-time is disclosed, the method comprising: obtaining, in real-time, randomly distributed stream of observations of CPS parameters, when at least a call condition is met, converting an observation of the CPS parameter to a uniform temporal grid (UTG), when at least a criterion for unloading at least one UTG node of the converted observations is satisfied, unloading the UTG nodes corresponding to the satisfied criterion, for each unloaded UTG node, calculating, for each output parameter of an CPS of a set of output parameters of the CPS, output values of the CPS parameters for the respective unloaded UTG node, and detecting an anomaly in the CPS based on the output values of the CPS parameters.

In one aspect, the at least one call condition includes at least one of the following: at least one new observation of the CPS parameter has been received from the stream; and one point in time of a set of predetermined points in time has arrived.

In one aspect, using at least one anomaly detector, at least one of the following anomaly detection methods is implemented: a method according to which an anomaly is detected in an event that an overall forecast error exceeds a threshold value, while output values of the CPS parameters of the CPS are preliminarily predicted and a total forecast error for the output values of the CPS parameters is determined; a method by which an anomaly is detected by applying a machine learning model to the output values of the CPS parameters; a method in which an anomaly is detected when an anomaly detection rule is executed; a method according to which an anomaly is detected based on a comparison of the output values of the CPS parameters with limit values of previously established ranges of values for the output values of the CPS parameters; and a method of combining results of two or more of the above methods.

In one aspect, for the stream, the properties of a flow unloading include at least one of the following: a flow unloading distance, and a timeout.

In one aspect, the flow unloading criteria include at least one of: a property for unloading distance along the stream that specifies a number of UTG nodes to which values of the output parameters of the CPS can be assigned; and a property for timeout unloading that specifies a processing time interval that determines a maximum waiting time for receipt of the values of the CPS parameters from the stream.

In one aspect, when the criteria for unloading at least two UTG nodes is satisfied, the flow unloading criterion is met for one UTG node, and the timeout unloading criterion is met for another UTG node, then, selecting, from among the at least two UTG nodes for which the criteria for unloading is satisfied, a particular UTG node having a greatest timestamp as the UTG node.

In one aspect, the one or more other UTG nodes are additionally unloaded sequentially preceding the UTG node that satisfies the criterion for unloading.

In one aspect, in the event that an observation of at least one CPS parameter relates to the unloaded UTG node, said at least one observation of the CPS parameter is also unloaded.

In one aspect, in the event that at least one observation of the input parameter of the CPS associated with the output parameter relates to the UTG node, the at least one observation of the input parameter is taken into account when calculating the output values of the CPS parameters.

In one aspect, the method further comprises performing the following steps subject to an arrival of at least one new observation of the CPS parameters from the stream; accumulating each received observation of the CPS parameter and assigning to the UTG node in accordance with a time of observation of the respective observation; for each received observation of the CPS parameter, checking at least one criterion for a recognition of a new head node of the UTG; and when at least one criterion for the recognition of the new head node is satisfied, recognizing the UTG node corresponding to the time of observation of the CPS parameter corresponding to the satisfied criterion as the head node of the UTG.

In one aspect, the criterion for recognition of the head node of the UTG comprises one of: a criterion for recognition by a representation; a criterion for recognition by a proportionality of an interval; and a criterion for recognition in a state of complete flow stoppage.

In one aspect, the method further comprises: when at least one condition for generating an incident is satisfied, generating an incident.

In one aspect, the conditions for the generating of the incident include at least one of the following: a condition for a "late observation" incident being a time of the observation of the data of the CPS parameter corresponding to a previously unloaded UTG node; a condition for a "source clock failure" incident being a time of the observation of the data of the CPS parameter being ahead of the timestamp of the head node of the UTG by a predetermined time interval; and a condition for a "loss of flow" incident, the incident being based on having the CPS parameter being no longer receiving observations for a predetermined amount of time specified for the CPS parameter, and information of the incident having being additionally added to the output parameters of the CPS.

In one aspect, the method further comprises: when a frequency of occurrence of "late observation" or "source clock failure" incidents exceeds a specified threshold, overriding the properties of the stream.

In one aspect, the method further comprises: if a set of input parameters of the CPS coincides with the set of output parameters of the CPS, then in each of the unloaded nodes of the UTG, calculating a value for each parameter of the CPS from the set of output parameters of the CPS depending on a number of observations of corresponding set of input parameters of the CPS assigned to the UTG node, and if one or more observations are accumulated in the UTG node for the set of input parameters of the CPS, aggregating the set of input parameters of the CPS in the UTG node based on the one or more accumulated observations.

In one aspect, the method further comprises: when a set of input parameters of the CPS coincides with the set of output parameters of the CPS, and none of the observations are accumulated in the unloaded UTG node for the CPS parameter, imputing missing values of the CPS parameter based on observations of the CPS parameter for earlier UTG nodes.

In one aspect, the values of the output parameters of the CPS in the UTG node is calculated according to dependence on associated CPS parameters; for each CPS parameter, the values of the output parameters are calculated depending on a number of observations of the CPS parameter attributed to the UTG node; for each CPS parameter, one or more observations are accumulated in the UTG node for the CPS parameter; and the aggregation is performed based on the one or more accumulated observations of the CPS parameter in the UTG node, in an earlier UTG node, or in both the UTG node and the earlier UTG node.

In one aspect, the output values of the CPS parameters of in the UTG node are calculated according to dependence of the associated CPS parameters, wherein, when no observation has been accumulated in the unloaded UTG node for at least one related CPS parameter, and the method further comprises: imputing a missing value of the CPS parameter based on one of: observations of the CPS parameter for earlier UTG nodes, previously calculated values of the CPS parameter for the earlier UTG nodes, and a combination of observations of the CPS parameter and previously computed output values of the CPS parameter for earlier UTG nodes.

In one aspect, the calculation of the output values of the CPS parameters of the UTG node is further based on values of other output or other input parameters of the CPS associated with the the output parameter of the CPS.

In one aspect, the method further comprises determining properties of the flow during a start of the flow or a resumption of the flow after an interruption.

According to one aspect of the disclosure, a system is provided for detection of anomalies in a cyber-physical system in real-time, the system comprising at least one memory; and at least one hardware processor coupled with the at least one memory and configured, individually or in combination, to: obtain, in real-time, randomly distributed stream of observations of CPS parameters, when at least a call condition is met, convert an observation of the CPS parameter to a uniform temporal grid (UTG), when at least a criterion for unloading at least one UTG node of the converted observations is satisfied, unload the UTG nodes corresponding to the satisfied criterion, for each unloaded UTG node, calculate, for each output parameter of an CPS of a set of output parameters of the CPS, output values of the CPS parameters for the respective unloaded UTG node, and detect an anomaly in the CPS based on the output values of the CPS parameters.

In one exemplary aspect, a non-transitory computer-readable medium is provided storing a set of instructions thereon for detection of anomalies in a cyber-physical system in real-time, wherein the set of instructions comprises instructions for: obtaining, in real-time, randomly distributed stream of observations of CPS parameters, when at least a call condition is met, converting an observation of the CPS parameter to a uniform temporal grid (UTG), when at least a criterion for unloading at least one UTG node of the converted observations is satisfied, unloading the UTG nodes corresponding to the satisfied criterion, for each unloaded UTG node, calculating, for each output parameter of an CPS of a set of output parameters of the CPS, output values of the CPS parameters for the respective unloaded UTG node, and detecting an anomaly in the CPS based on the output values of the CPS parameters.

A first technical result is to bring an arbitrarily distributed stream of observations of CPS parameters coming in real time to the UTG. A second technical result is a reduction in time for bringing an arbitrarily distributed stream of observations of CPS parameters received in real time to the UTG. A third technical result is a formation of the flow of values of the output parameters without gaps when converting from the CPS to the UTG. A fourth technical result is a preparation of data in a form and volume necessary for correct operation of anomaly detectors and predictive analyzers. A fifth technical result is improvement in the quality of anomaly detection in the CPS by: bringing an arbitrarily distributed flow of observations of the CPS parameters coming in real time to UTG, and identifying anomalies in values of the output parameters of the CPS after being converted to the UTG. The improvement in the quality includes, in particular, obtaining a low number of errors of the first and second types, and a reduction in detection time.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 5 illustrates an exemplary of a method for stream processing to deliver a stream of real time observations of CPS (parameters to the Uniform Temporal Grid (UTG) in accordance with aspects of the present disclosure.

DETAILED DESCRIPTION

Exemplary aspects are described herein in the context of a system, method, and a computer program for detection of anomalies in a cyber-physical system (CPS) in real-time in accordance with aspects of the present disclosure. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

Figure 14:
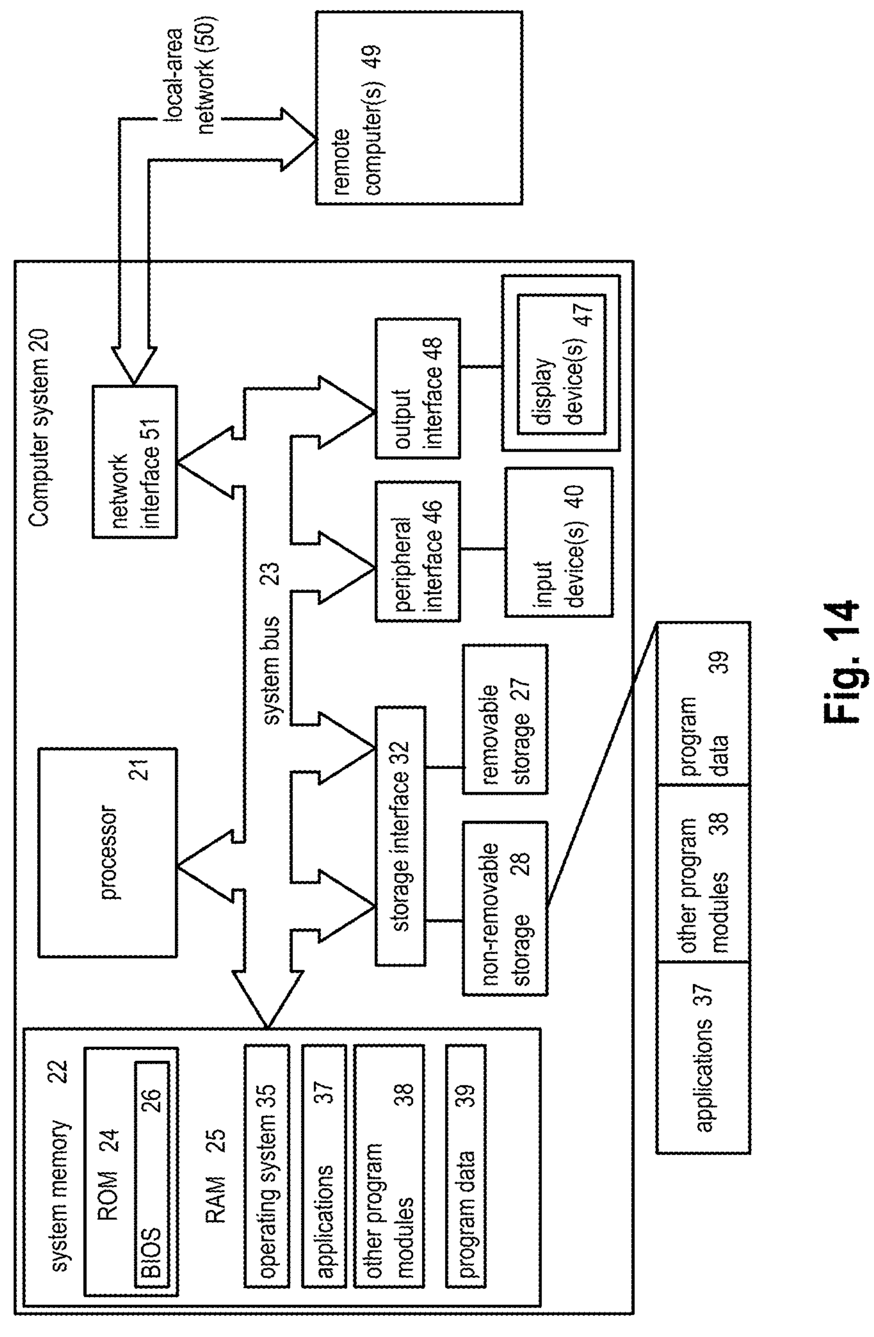
FIG. 14 presents an example of a general purpose computer system on which aspects of the present disclosure for detection of anomalies in a cyber-physical system in real-time can be implemented.

In some aspects of the present disclosure, some or all components of the system for detection of anomalies in a cyber-physical system in real-time may be implemented on the processor of a general-purpose computer (which, for example, is depicted in FIG. 14). In this case, the components of the system may be implemented within a single computing device, or distributed amongst several interconnected computing devices.

In order to clearly describe the teachings of the present disclosure, a glossary of terms and concepts is first provided below.

An information system (IS) refers to a set of computing devices and communications used to communicate with and among the set of computing devices.

A cyber-physical system (CPS) refers to an information technology concept that involves the integration of computing resources into physical processes. Examples of a cyber-physical system are a technological system, the Internet of Things (including wearable devices), and the Industrial Internet of Things.

Internet of Things (IoT) refers to a computing network of physical objects ("things") equipped with built-in network technologies for interacting with each other or with the external environment. The Internet of Things includes technologies such as wearable devices, electronic vehicle systems, smart cars, smart cities, industrial systems, etc.

Industrial Internet of Things (IIoT) consists of network-connected hardware and advanced analytics platforms that process data from connected devices. IIoT devices can range from small weather sensors to complex industrial robots. While the word "industrial" conjures up images such as warehouses, shipyards, and manufacturing floors, IIoT technologies have great potential to be used in a wide variety of industries, including agriculture, healthcare, financial services, retail, and advertising. The Industrial Internet of Things is a subcategory of the Internet of Things.

An "object" in the context of the present disclosure refers to an object of monitoring, in particular, to an IS or a CPS.

A Technological process (TP) refers to a process of material production, which consists in a sequential change of states (as well as certain properties) of a material entity (object of labor). For example, a physical process, a chemical process. The TP can be carried out in the CPS.

A uniform temporal grid (UTG) refers to an infinite sequence of moments in time in which the distance between adjacent elements of the sequence is invariable (the same).

A UTG node refers to any of the moments in time that make up the UTG.

The timestamp of the UTG node refers to the point in time corresponding to a particular UTG node.

A cell of a UTG node is a time interval around a UTG node, the length of which is equal to the distance between the nodes (i.e., the timestamps of the UTG nodes). The cell determines which points on the time axis belong to the UTG node. In one aspect, the UTG node is located in the center of its cell. In other aspects, the UTG node is located to the left or right of the center of its cell.

The UTG is characterized by three parameters (see example in FIG. 8):

- Period (inversely proportional to frequency)—which refers to the distance between grid nodes;
- Phase—which refers to the position of the nodes relative to the time of day (for example, the interval between midnight and the nearest UTG node following midnight);

Left margin—which refers to the distance between the left border of the cell and the corresponding UTG node as a fraction of the UTG period (0.5 if the UTG node is in the center of its cell).

A Process Variable (PV) parameter refers to a current measured value of a certain state of a TP, CPS, or IS that is observed or monitored. An example of a process parameter may be a temperature, a pressure, a flow, a volume, a mass, and others.

A setpoint refers to a supported value of a process parameter. For example, for the process parameter "temperature", the setpoint can be a maintained temperature (e.g., 0 degrees or 100 degrees Celsius). In another example, for the process parameter "pressure", the setpoint may be the maintained pressure.

A Manipulated Variable (MV) refers to a parameter that is adjusted so that the value of a process parameter is maintained at the setpoint level. For example, in order to maintain the water temperature in the tank (technological parameter) at the setpoint of 100 degrees, the level of gas supply (controlled parameter) from the cylinder to the gas heater is regulated.

A CPS parameter (tag) parameter refers to a parameter that characterizes the operation of the CPS, including one of the following: a technological parameter, a setpoint, a controlled parameter that relates to the CPS, as well as derived parameters calculated on the basis of the parameters listed above. For example, for a physical or chemical process, the CPS parameter is the process parameter of the CPS. Moreover, these processes are continuous. Therefore, the CPS parameter is also continuous and takes on a specific value at each point in time, regardless of whether the value of the specified FSC parameter has been measured or not at any point in time.

The CPS parameters can be divided into two types: natural parameters and derived parameters. The values of the CPS parameter may be received from the object where they were measured (such a CPS parameter is also called the natural CPS parameter), or may be calculated by the data receiver based on values of one or more natural CPS parameters (such a CPS parameter is called the derived CPS parameter, while the CPS parameters based on which the derived CPS parameter is calculated are called the initial CPS parameters for the specified derived CPS parameter). The derived CPS parameter can also be calculated from other derived CPS parameters or from both natural and derived CPS parameters. The method of the present disclosure works equally correctly with any parameters of the CPS, both natural and derivative. Therefore, in the description of the implementation options, all types of CPS parameters will be taken into account. However, in certain aspects, where it is important for the operation of the method of the present disclosure, the parameters of the CPS will be divided into natural and derivative.

Examples of natural CPS parameters are: T1 (temperature of one sensor), T2 (temperature of another sensor), P (pressure), V (volume), U (electrical voltage), I (current).

Examples of derived CPS parameters: T3=T1/100 (temperature T1 as a percentage of 100 degrees); W=U·I (electric power); T3 is equal to the moving average from T1; T4=T1−T2 (difference); P1=1 if the P values are received and the condition P>10 is met, otherwise P1=0.

Telemetry refers to a set of CPS parameters. Telemetry data is a collection of CPS parameter values.

Data time (event time) refers to the moment in time at which the value of the CPS parameter was measured or otherwise generated based on the clock of the data source (monitored object). The data time uniquely identifies the UTG node to which the corresponding CPS parameter observation belongs, according to the cell of the UTG node to which the specified data time relates.

Processing time (system time) refers to the time measured by the clock of the data receiver, for example, by the system clock of the computer running the stream processor.

Observation of the CPS parameter is a set of three values, which includes: the identifier of the CPS parameter (name, serial number or other indication of a specific CPS parameter); the value of the CPS parameter measured or otherwise generated at a particular point in time (data time); the time point in time (data time) clock value of the CPS data source. In the context of data flow processing, a distinction may be made between a data point and an observation received by the data receiver. In the latter case, the time of arrival of the observation according to the clock of the data recipient (processing time) is added to the monitoring attributes.

A CPS parameter flow refers to a sequence of observations of the CPS parameter that is perceived during processing.

Telemetry stream, CPS parameter observation stream, CPS parameter value stream, input stream (hereinafter referred to as the stream) refer to a sequence of observations of CPS parameters (also known as CPS input parameters) from a given set of CPS input parameters.

Output telemetry stream, CPS output parameter observation stream, CPS output parameter value stream, output stream refer to a sequence of observations of CPS output parameters from a given set of CPS output parameters that is, a sequence of CPS output parameter values in UTG nodes.

A stream processor (SP) refers to a hardware and software module (service) that performs an substantially real-time conversion of an arbitrarily distributed in time stream of observations of CPS parameters into a stream of observations of the same or derived from them CPS parameters (output parameters of the CPS) converted to the UTG, i.e., performing a reduction to fit an arbitrarily distributed stream of observations of CPS parameters to the UTG.

"Near real-time" refers to a delay in a stream processor output in a stream conversion, wherein the delay is relative to the input stream. The term near real-time implies that the delay is either not noticeable at all or is perceived by the user as being negligible.

A data path management system (DPMS) refers to a part of the data flow analysis system of the CPS, responsible for the transfer of observations and related data between various modules (e.g., services) of the system that receive, process or store the data. The DPMS is a system external to the stream processor that calls the stream processor and receives the results of the work of the stream processor.

Aggregation refers to a procedure for determining the value of a CPS parameter in a UTG node based on one or more observations of this CPS parameter assigned to a cell of this UTG node. Examples of aggregation include taking the value of the most recent observation (by time of the data); and calculating the average value of cases. For a derived CPS parameter that depends on one or more other CPS parameters (input CPS parameters), in one aspect, aggregation may be accomplished by determining the value of the derived CPS parameter at the UTG node based on one or more observations, specified input CPS parameters assigned to the cell of that UTG node. In another aspect, the values of the specified one or more output parameters of the CPS are first determined, including using aggregation, and then the value of the derived parameter of the CPS is determined according to the dependence on the specified input parameters of the CPS.

An empty UTG node refers to a node whose cell has not received a single observation of a specific CPS parameter or any observation at all.

Imputation refers to a procedure for determining the value of the CPS parameter for an empty UTG node based on the values of this CPS parameter generated for earlier UTG nodes. An example of an imputation is repeating the value of the CPS parameter from the previous node. In the context of the present disclosure, imputation refers to a special case of interpolation. Both imputation and interpolation are designed to reconstruct a missing value, but imputation can only use known values from the past, while interpolation can use both past and future values. Accordingly, imputation may be applied to stream processing, but interpolation in general form cannot be applied to stream processing.

In one aspect, for a derived CPS parameter that depends on one or more other CPS parameters (input CPS parameters), an imputation may be performed on an empty UTG node based on the values of that derived CPS parameter generated for earlier UTG nodes.

In another aspect, for a derived CPS parameter, imputation may be performed on an empty UTG node based on the values specified for one or more of the initial CPS parameters generated for earlier derived nodes.

In another aspect, for a derived CPS parameter, imputation can be performed on an empty UTG node based on both the values of the specified one or more initial CPS parameters assigned to earlier UTG nodes and the values of this derived CPS parameter generated for earlier UTG nodes.

A computer attack (also known as a cyber attack) refers to a purposeful impact on information systems and information and telecommunication networks by software and hardware, carried out in order to violate the security of information in these systems and networks.

An "anomaly" for the CPS or IS refers to a deviation from the technological process in the CPS or IS. An anomaly can occur, for example, due to a computer attack, due to incorrect or illegitimate human intervention in the operation of a vehicle or technological substation, due to a failure or deviation of the technological process, including those associated with periods of changing its modes, due to the transfer of control loops to manual mode or due to incorrect sensor readings, as well as for other reasons known from the state of the art. The anomaly may be characterized by a deviation of the CPS parameters.

An "anomaly area" or an "anomaly localization area" refers to a range of time of the anomaly observation (time domain), and/or a location of the anomaly. That is, the anomaly area or anomaly localization area may provide an indication of the element or part of the CPS where the anomaly occurred (in spatial domain), such as an indication of the sensor or its coordinates in which the anomaly occurred. For each anomaly, the anomaly's localization area is defined—temporally and/or spatially. In order to define spatial areas, the CPS can be divided into different parts according to belonging to different TPs or parts thereof, according to belonging to different physical or logical domains of the CPS, and according to other criteria, including those specified by the CPS operator.

Figure 1:
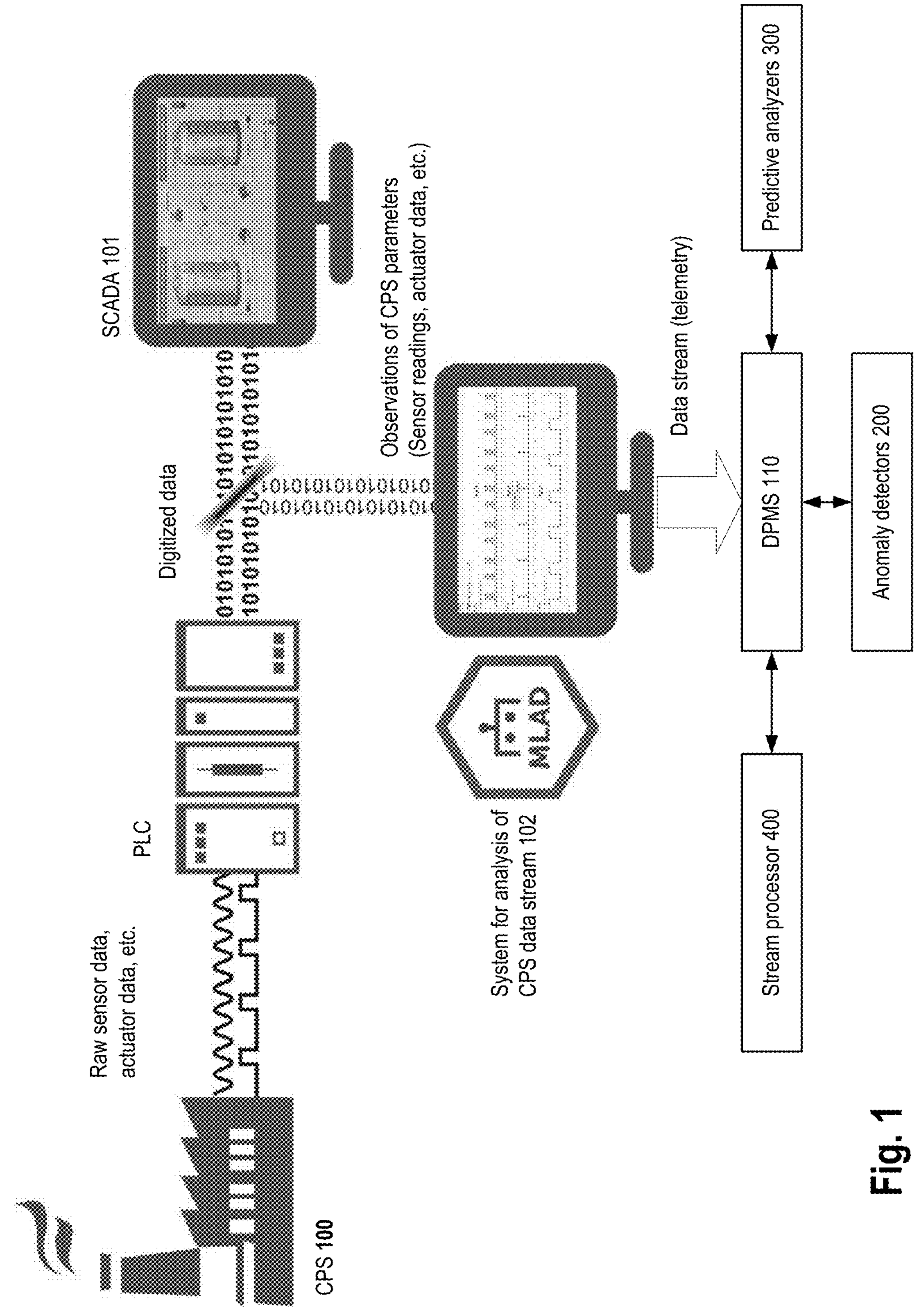
FIG. 1 illustrates a block diagram of an exemplary Cyber-Physical System (CPS) and interactions of the cyber-physical system with a stream processor in accordance with aspects of the present disclosure.

FIG. 1 illustrates a block diagram of an exemplary system 100 for detection of anomalies in a cyber-physical system in real-time in accordance with aspects of the present disclosure.

FIG. 1 illustrates a block diagram of an exemplary Cyber-Physical System (CPS) 100 and interactions of the cyber-physical system 100 with a stream processor 400 in accordance with aspects of the present disclosure. In FIG. 1, the CPS 100 is presented in a simplified form. Examples of CPS 100 are the Process System (TS), the Internet of Things, the Industrial Internet of Things, IS, and TP. For ease of understanding, the following description will refer to the TC as the main example of CPS 100. The CPS 100 contains a variety of sensors, actuators, PID controllers, the data of which are transmitted in raw form to the PLC (Programmable Logic Controller). An analog signal can be used to transmit data. The PLC then processes the data and converts the data into digital form—thereby converting observed values of CPS parameters to CPS telemetry stream, and/or to events (e.g., activation of a particular sensor, triggering of sensor alarms, individual commands, etc.). Observations of the CPS parameters are then transmitted, for example, to the SCADA 101 system (supervisory control and data acquisition) and the CPS data flow analysis system 102 (e.g., a system such as Kaspersky MLAD (machine learning anomaly detection) or any other system for analyzing the data flow of the CPS), which includes a data path management system (DPMS) 110.

In one aspect, the DPMS 110 comprises a system responsible for transmitting observations of CPS parameters and related data between various other modules (services) that receive, process or store them. In particular, to the stream processor 400, anomaly detectors 200, and predictive analyzer 300. The DPMS 110 is external to the stream processor 400 that invokes (initiates the initiation or resumption of operation by transmitting the data required for specified start or resume) a stream processor 400 and receives the results of the operations of the stream processor 400, which may then be transmitted to anomaly detectors 200 (also anomaly detection modules, hereinafter referred to as detectors) as well as to predictive analyzers 300.

Figure 2:
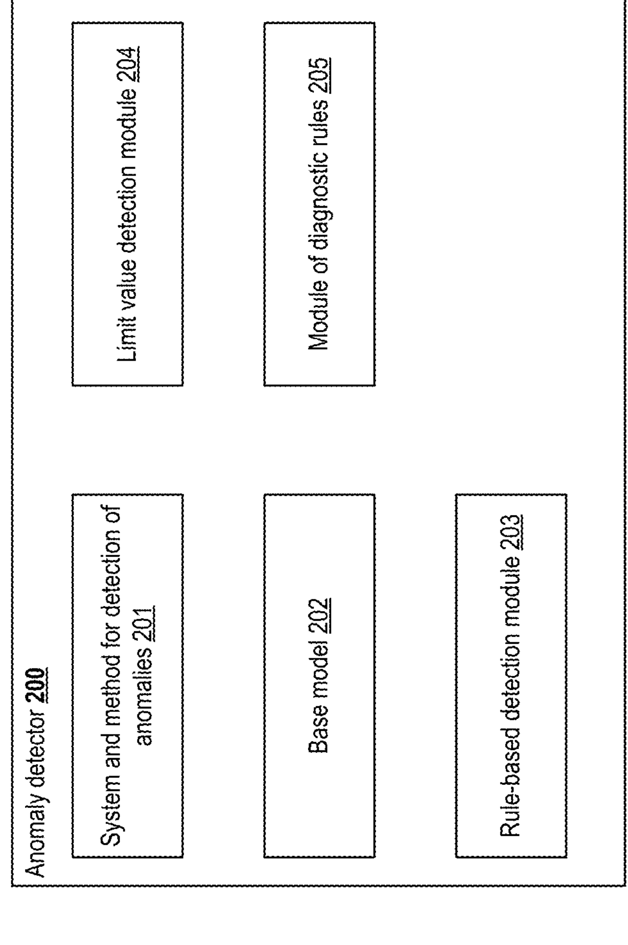
FIG. 2 illustrates a block diagram of an exemplary anomaly detector in accordance with aspects of the present disclosure.

FIG. 2 illustrates a block diagram of an exemplary anomaly detector 200 in accordance with aspects of the present disclosure.

In one aspect, the detector 200 is used to detect anomalies in the CPS 100 in the output values of the CPS output parameters converted to the UTG, as well as to determine the accompanying information about the detected anomalies.

In one aspect, the anomaly information in the CPS 100 includes information such as the anomaly localization area, the values of the output parameters of the CPS at each point in the anomaly observation time range, the contribution of each output parameter of the CPS to the anomaly, information about the method of detecting the specified anomaly (i.e., about the detector 200 that detected the anomaly). In yet another aspect, the anomaly information in the CPS 100 additionally includes, for each output parameter of the CPS, at least one of the following: a time series of values, the current value of the deviation of the predicted value from the actual value, a smoothed amount of deviation of the predicted value from the actual value. In another aspect, information about anomalies in CPS 100 additionally includes information on the maximum, minimum and average values of the output parameters of the CPS taken in the area of anomaly localization, other statistical and deterministic characteristics, including sample dispersions and quantiles, the Fourier spectrum and wavelet transformations, convolutional operators from the output parameters of the CPS.

In one aspect, the system and method for determining the anomaly 201 in the CPS 100 may be used as detectors 200, examples of which are described in the commonly owned U.S. Pat. Nos. 11,175,976 and 11,494,252 incorporated by reference herein. The U.S. Pat. Nos. 11,175,976 and 11,494,252 describe how to determine the anomaly: by predicting the values of a subset of the output parameters of the CPS (the term "CPS features" was used in the patents mentioned above to correspond to the term "CPS parameters" in the present disclosure), and then by determining the overall error forecast for a subset of the output parameters of the CPS, while determining the anomaly in CPS 100 if the total forecast error exceeds the threshold value. In addition, the contribution of a subset of the output parameters of the CPS to the total forecast error is determined as being the contribution of the forecast error of the corresponding output parameter of the CPS to the total forecast error.

In one aspect, the detectors 200 may include a module of the base model 202 designed to apply a trained machine learning model to detect anomalies from the values of a subset of the output parameters of the CPS (hereinafter referred to as the base model). In doing so, the base model may be trained on data from a training sample that includes known anomalies in the CPS 100 or does not include known anomalies but includes known behavior at normal operation of the CPS 100, as well as the values of a subset of the output parameters of the CPS for a certain period of time, that is, a supervised machine learning model is used. Alternatively, an unsupervised machine learning model can be used as the base model. To improve the quality of the base model, they can test and validate the trained base model on test and validation samples, respectively. At the same time, testing and validation the samples may include known anomalies and subset values of the output parameters of the CPS for a period of time prior to the known anomaly in CPS 100, but the test and validation samples specified are different from the training sample.

In yet another aspect, the detectors 200 include a rule-based detection module 203 using which anomaly detection rules are applied. Such rules may be pre-generated and received from the CPS operator via a feedback interface and may contain conditions that apply to the values of a subset of the output parameters of the CPS that determine the anomaly.

In yet another aspect, the detectors 200 include a limit-value detection module 204 that detects an anomaly when the value of at least one output CPS parameter out of a subset of the output CPS parameters falls outside the predetermined range of values for the specified output CPS parameter. In this case, the specified ranges of values may be calculated from the values of characteristics or documentation for the CPS 100 or received from the CPS operator via a feedback interface.

In yet another aspect, the detectors 200 include a diagnostic rule module 205 that generates diagnostic rules by specifying a list of the output parameters of the CPS used in said diagnostic rule and a method for calculating the values of the auxiliary (indicator) parameter of the CPS, followed by calculating the values of the auxiliary parameters of the CPS using a specified list of output parameters of the CPS and in accordance with the formed diagnostic rule. As a result, the diagnostic rules module 205 determines the anomaly in the CPS 100 based on the values of all the output parameters of the CPS. An example of the diagnostic rule module 205 is described for example, in Russian Patent No. RU2790331.

In another aspect, the detectors 200 include a graphical interface system for the manual detection of anomalies by the CPS operator (an example of such graphical interface system may be found in U.S. Pat. No. 11,175,976), information about which can be communicated via a feedback interface.

Figure 3:
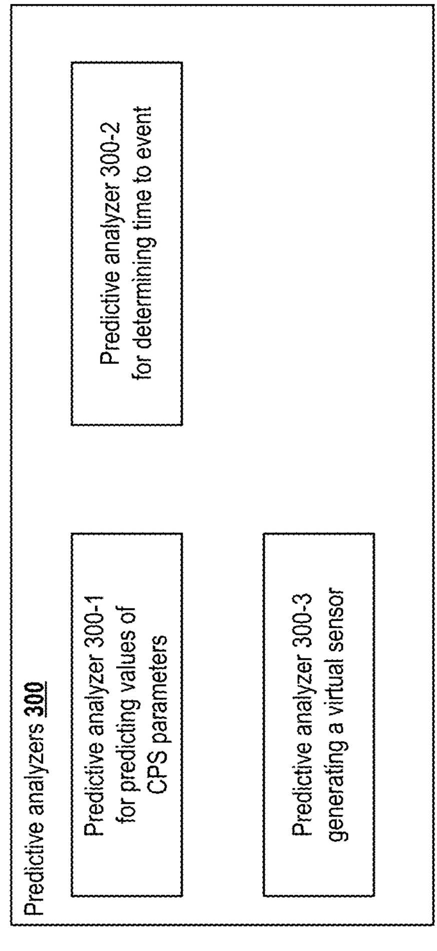
FIG. 3 illustrates a block diagram of an exemplary predictive analyzer in accordance with aspects of the present disclosure.

FIG. 3 illustrates a block diagram of an exemplary predictive analyzer 300 in accordance with aspects of the present disclosure.

In one aspect, the predictive analyzers 300 are used for predictive analysis of the values of the output parameters of the CPS after it is converted to the UTG, i.e., to form a judgment about the most probable behavior of the CPS 100 in the future based on observations of the CPS parameters (i.e., the input parameters of the CPS associated with the mentioned output parameters of the CPS) in the present and the past.

In the context of the description of the predictive analyzers 300, the "future", with respect to each specific CPS parameter, is considered to be all and any of the data time points following the latest moment T of the data time, for which the value of the CPS parameter is known from observation at the time the result of the predictive analyzer 300 is generated. The time point of the data T is considered to be the "present".

In the context of the application of the predictive analyzers 300, with a stream processor 400, the concept of "future" is defined as any and all of the UTG nodes following the last unloaded UTG node, i.e., the last UTG node for which the values of the output parameters of the CPS from the set of output parameters of the CPS are computed. This last node of the UTG is considered to be the "present" (moment in time).

Figure 4:
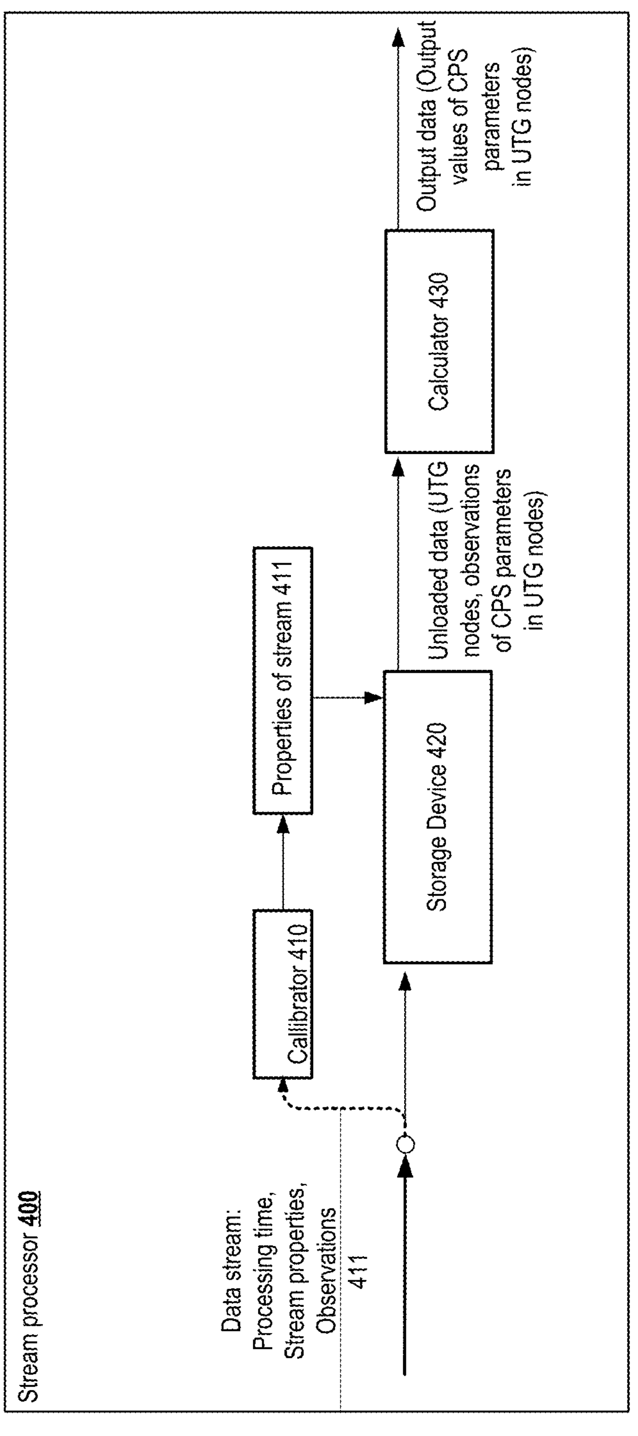
FIG. 4 illustrates a block diagram of an exemplary architecture of a stream processor in accordance with aspects of the present disclosure.

Unloading of the at least one UTG node is performed by storage device 420, shown in FIG. 4, and involves reading data (e.g., into RAM 25 of FIG. 14) of the selected at least one UTG node and, if there are selected observations, of the CPS parameters for use, in particular by the calculator 430, as shown in FIG. 4.

In one aspect, the output of the predictive analyzer 300 includes predicting the probable values of one or more output parameters of the CPS at one or more future data points (e.g., FIG. 3, predictive analyzer 300-1).

In another aspect, the output of the predictive analyzer 300 includes a data time interval in the future within which the value of the output parameter CPS will reach a predetermined level with a given probability (e.g., FIG. 3, predictive analyzer 300-2). This implementation is called "time to event estimation."

In yet another aspect, the output of the predictive analyzer 300 comprises predicting the probable values of one or more of the output parameters of the CPS at present or at one or more points in the data in the future, when the above-mentioned output CPS parameters are not observed (i.e., observations of the input parameters of the CPS associated with said output parameters of the CPS have not been generated by the source or have not been received by the receiver) at least in the present and in the near past (a given interval of time back relative to the current point in time), although it may have been observed at some distant point in the past (more than a given interval of time back relative to the current point in time). This implementation is carried out, for example, by the predictive analyzer 300-3, shown in FIG. 3, and is referred to as a "virtual sensor" or "soft sensor".

FIG. 4 illustrates a block diagram of an exemplary architecture of a stream processor 400 in accordance with aspects of the present disclosure. The stream processor 400 may include a calibrator 410, a storage device 420, and a calculator 430. The stream processor 400 and its constituent elements may be implemented on a computer 20, an example of which is shown in FIG. 14.

The stream processor 400 receives input observations of the CPS parameters (from the CPS input parameter set) from the CPS parameter observation stream. The output of the stream processor 400 contains the values of the output parameters of the CPS (from the set of output parameters of the CPS) at the UTG nodes. A set of input parameters of the FSC and a set of output parameters of the CPS can be specified in advance, for example, by the operator of the CPS 100, DPMS 110, stream processor 400. In one example implementation, a set of CPS output parameters may be specified first, and then a set of CPS inputs associated with the specified CPS outputs will be defined.

Each output parameter of the CPS is associated (depends) with at least one of the input parameters of the CPS, in particular, coincides with one of the input parameters of the CPS (e.g., for natural CPS parameters, but also valid if the input parameter is a derivative of the CPS parameter from other natural CPS parameters) or is derived from at least one of the input parameters of the CPS. That is, the output parameters of the CPS can be both natural and derived parameters of the CPS.

In this way, the stream processor 400 converts an arbitrarily time-distributed stream of observations of the CPS parameters into a stream of observations of the same or derived from them of the CPS parameters converted to the UTG (i.e., the output parameters of the CPS converted to the UTG).

In one aspect, the output parameters of the CPS correspond to the parameters of the CPS (from the set of input parameters of the CPS). In this case, the set of output parameters of the CPS is the same as the set of input parameters of the CPS.

In another aspect, the CPS output parameter set comprises at least one CPS parameter from the CPS input parameter, as well as at least one derived CPS parameter that depends on at least one CPS input parameter.

In yet another aspect, the output parameter set of the FS comprises only the derived parameters of the CPS from at least one input parameter of the CPS.

For example, if the length, height, and width of some parallelepiped-shaped object are present in the set of input parameters of the CPS, which are the natural parameters of the CPS, then the length, height, and width of the same object may be present among the output parameters of the CPS, but there may also be a derived parameter of the CPS, which characterizes the volume of this object equal to the product of length, height, and width. In another example, if the natural CPS parameter, air temperature, is present in the CPS input parameter, then the air temperature will be present among the CPS outputs, but there may also be a derived CPS parameter equal to the moving average of the air temperature calculated over the last 10 days. In the third example, if the air temperature and surface temperature of the object are present in the CPS input set, the air temperature (the natural parameter) will not be present among the CPS outputs, and the surface temperature of the object will be present, but the moving average of the air temperature (derived from the air temperature) will also be present. In the fourth example, if the CPS input set contains air temperature and surface temperature of the object, then both the air temperature and the surface temperature of the object may not be among the CPS outputs, but there will be a moving average of the air temperature calculated over the last 10 days, as well as a moving average of the surface temperature of the object calculated over the last 10 days.

In one aspect, the calibrator 410 is designed to analyze a given amount of data in a stream of observations of the CPS parameters (CPS input parameters) from the CPS set of input parameters in order to determine or override the properties of the stream 411 (i.e., calibration and recalibration of the storage device 420, the properties of the stream 411 are disclosed below in conjunction with FIG. 5). In one aspect, properties of stream 411 may also be set by having default values. The properties of the stream 411 are used by the storage device 420 in the normal operation of the stream processor 400. The storage device 420 is designed to accumulate the CPS parameters obtained from the observation stream and assign them to the appropriate UTG nodes. In addition, the storage device 420 is also designed to unload the UTG nodes that meet the unloading criterion, together with the observations of the CPS parameters attributed to them, for their subsequent transmission to the calculator 430. The UTG units are unloaded relative to the head unit of the UTG.

The head node of the UTG is the UTG node, which includes most of the observations of the CPS parameters that have already been received and are still expected around the current time of processing. The head node of the UTG characterizes the relationship between the time of data and the time of processing. The head unit of the UTG is appointed (recognized) according to the criteria for recognition of the new head unit of the UTG, which will be disclosed below.

In one aspect, the calculator 430 is designed to compute the values of the output parameters of the CPS from a set of output parameters of the CPS in the UTG nodes based on UTG nodes unloaded by the storage device 420 and observations of the CPS parameters (if any) in the specified UTG nodes.

A detailed disclosure of the implementation of the stream processor 400, as well as aspects thereof, are provided below in conjunction with FIG. 5.

In one aspect, the stream processor 400 may be an independent module that independently determines when the processing of the stream starts. In another aspect, the stream processor 400 may be invoked by an external system, e.g., by the DPMS 110 or the CPS data flow analysis system 102. In the example, the DPMS 110 calls the stream processor 400 when one of the following occurs:

- a new observation of the CPS parameter (or several new observations of the CPS parameter) was received from the monitored object; and/or
- a processing time point that was previously specified (or suggested) by the stream processor 400 itself for calling the stream processor has arrived.

With respect to the latter case, it is worth noting that, generally speaking, the DPMS 110 can call the stream processor 400 at any given time. The output of the stream processor 400 (i.e., the composition of the output values of the CPS in the UTG nodes) does not depend on how often and when the DPMS 110 calls the stream processor 400. But, in order for the output stream to be generated within a time as close to real time as possible (which is determined, for example, by a lag of a given amount of output stream generation time relative to real time), in one aspect, calls to the stream processor 400 occur at the processing times suggested or specified by the stream processor 400.

Each time the stream processor 400 is called, the DPMS 110 passes to the stream processor 400, in particular, one or more of the following arguments:

a list of new observations received in the input stream, i.e., new values of the CPS parameters (the list may be empty if the stream processor 400 is called in time); and a current processing time (e.g., system clock readings of DPMS 110).

After each call, the stream processor 400 may return at least one of the following lists to the DPMS 110, and any of the returned lists may be empty:

output observations, i.e. the values of the output parameters of the CPS in the UTG nodes;

suggested moments of subsequent calls to the stream processor 400 in processing time; and a list of incidents that occurred during the processing of the input stream (e.g., "Late Observation", "Source Clock Failure", "Lost Stream").

Figure 6:
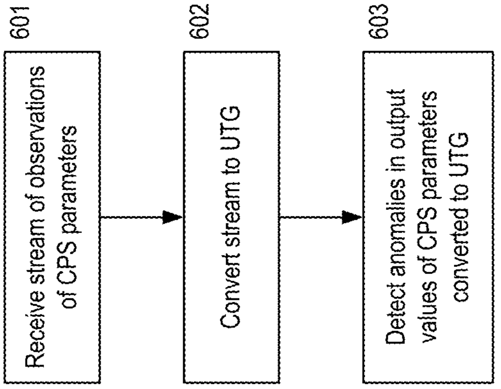
FIG. 6 illustrates an example of a method for detecting anomalies in the CPS in real time in accordance with aspects of the present disclosure.
Figure 7:
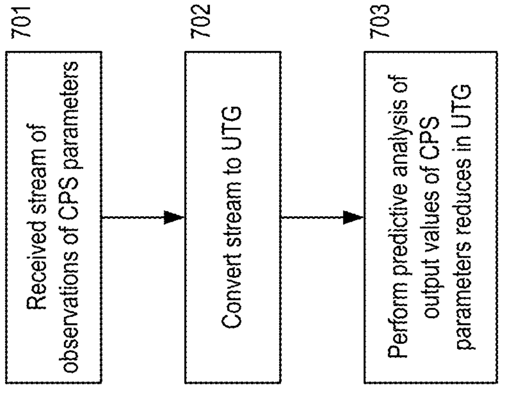
FIG. 7 illustrates an example of a method for performing predictive analysis in the CPS in real time in accordance with aspects of the present disclosure.

The DPMS 110 may handle the results of a call to the stream processor 400 as follows:

the values of the output parameters of the CPS in the UTG nodes are placed in the data path (output stream), from where they are sent to the next recipient, for example, to the anomaly detectors 200, to the predictive analyzers 300 (as described in conjunction with FIG. 6 and FIG. 7);

incidents are sent to one or more modules designed to work with incidents (e.g., a module associated with a service, not specified in the drawing).

the suggested moments of subsequent calls are used to set timers for calling the stream processor 400 in the future.

As described above, the DPMS 110 calls the stream processor 400 on step 501.

FIG. 5 illustrates an exemplary of a method 500 for stream processing to deliver a stream of real time observations of CPS (parameters to the Uniform Temporal Grid (UTG) in accordance with aspects of the present disclosure.

Returning to FIG. 4, steps 520-521 of FIG. 5 are performed by the calibrator 410 shown in FIG. 4, steps 502-507 of FIG. 5 are performed by the storage device 420 of FIG. 4, and step 508 of FIG. 5 is performed by the calculator 430 of FIG. 4.

In step 501, by the DPMS 110, method 500 calls the stream processor 400.

In step 502, method 500 determines whether at least one new observation of at least one CPS parameter is received from the stream. When at least one new observation is received, method 500 proceeds to step 503. Otherwise, the method proceeds to step 506.

In step 503, method 500 accumulates the received at least one new observation of at least one CPS parameter, and assigns and accumulates each of the at least one new observation of at least one CPS parameter to a UTG node in accordance with a time of observation of the respective CPS parameter. The accumulation of observations of CPS parameters and UTG nodes means any storing of the specified data with the possibility of their subsequent reading. The data can be stored (accumulated) as on a machine-readable medium (e.g., memory devices 27-28 in FIG. 14) and in RAM (e.g., RAM 25 of computer 20 of FIG. 14). Data can be stored (accumulated) in the form of a list, database, files or in any other way.

In step 504, for each new observation of the at least one CPS parameter, method 500 determines whether at least one criterion for recognition of a new head node of the UTG parameter is satisfied. When at least one criterion for recognition of a new head node is satisfied, method 500 proceeds to step 505. Otherwise, the method proceeds to step 506.

In step 505, method 500 recognizes the UTG node that corresponds to the time of observation of the respective CPS parameter as a head node of the UTG, i.e., as the new head node of the UTG.

In a particular aspect, the criterion for recognition of a new head node of the UTG may comprise criteria based on at least one of:

a) recognition criterion by representation: the UTG node (node N) following the head node of the UTG (node H) is recognized as the head node of the UTG, if for node N observations have been received for a number of CPS parameters that is equal to or higher than a prespecified number (e.g., based on regularity of the flow R);

b) recognition criterion according to proportionality of an interval: node N is recognized as the head node of the UTG if the observation of the CPS parameter corresponding to the node N at the time of processing (T_now) is obtained, and, where Th is $$\text{T\_now} - Th \geq ((N-H)/p - 1) \cdot Da\frac{(N-H)}{p} > 1$$

processing time when the node H was recognized as the head node of the UTG, p is the period of the UTG, Da is the average processing time interval between recognitions of a given number of the last head nodes of the UTG; and c) standstill recognition criteria: ff the storage device 420 is in the "standstill" state, then Node N is recognized as the head node of the UTG immediately upon receipt of any observation of the CPS parameter corresponding to Node N.

In another particular aspect, the proportionality of interval recognition criterion is used when the representation recognition criterion is not applicable.

In yet another particular aspect, the interval proportionality recognition criterion is configured in the settings of the stream processor 400: the specified criterion is used either for all CPS parameters or only for predefined CPS parameters. In the latter case, the storage device 420 checks both criteria at the same time (the representation of the values of the CPS parameters among the entire set of input parameters of the CPS, and the proportionality of the interval for a new head node of the UTG is assessed. Then, if at least one of the tested criteria has been met, the new head node is recognized.

In a particular aspect, at the start of operation of the storage device 420, the first incoming observation of a given CPS parameter forms the first head node of the UTG for the stream.

Thus, as described above, in the event that no new observations of the CPS parameter are obtained at step 502, the method proceeds to step 506. In addition, if none of the criteria for the recognition of a new head node of the UTG is met at step 504, the method proceeds to step 506.

In step 506, method 500 determines whether at least one criterion for unloading at least one UTG node is satisfied. Whether or not the at least one criterion for the unloading of the at least one UTG node is performed by taking into account, in particular, the stream properties 411 of the observations of the CPS parameter from the FSC input parameter set. When none of the unload criteria are met, method 500 proceeds to step 510. When at least one of unload criteria is satisfied, method 500 proceeds to step 507.

In step 507, method 500 unloads UTG nodes corresponding to the satisfied at least one criterion for unloading. The method then proceeds to step 508.

In a particular aspect, if at least one CPS parameter is observed to the unloaded UTG node, the at least one CPS parameter observation is also unloaded.

Unloading refers to the reading of data (e.g., to RAM 25) of the selected UTG nodes and, if there are selected observations of the CPS parameters, in step 508 as described below. Moreover, the unloaded data will be excluded from the number of accumulated data. An exception may include removing or marking the unloaded data that the next time the stream processor 400 is called. In addition, the unloaded data will not be used in validation of the unload criteria, in step 506, and beyond. In this way, the operability of the method of the present disclosure as close to real-time mode as possible is ensured.

The unloaded data may also be stored on a machine-readable medium for later use, either in step 508 or in a subsequent call to the stream processor 400.

In step 508, method 500 computes output values of CPS parameters for the unloaded UTG nodes. In one aspect, the method also detects incidents in the stream of observations based on the computed output values of the CPS parameters for the unloaded UTG nodes. That is, in each of the unloaded UTG nodes, for each output parameter of the CPS from the set of output parameters, the CPS computes its value based on the respective unloaded UTG node, and this value corresponds to a data time equal to the timestamp of the UTG node to which the value of the output parameter of the CPS relates. Then, incidents are detected based on the computation.

In one aspect, if at least one observation of the input parameter of the CPS is related to the UTG node, the output parameter of the CPS that is associated with the input parameter is taken into account when calculating the value of the output parameter of the CPS. Calculation of the values of the output parameters of the UTG from the set of output parameters of the UTG in the UTG nodes is carried out based on the unloaded UTG nodes and observations of the UTG parameters (if any) in the specified UTG nodes.

In one aspect, the properties of the stream 411 include at least one of the following:

- the unloading distance along the stream—Ds (the specified number of UTG nodes to which the values of the CPS parameters coming from the stream can be assigned), and
- the timeout—Dt (the specified processing time interval that determines the maximum waiting time for the receipt of the values of the CPS parameters from the stream).

Calibration of the storage device 420, i.e., determination of the specified values of Ds, Dt, is carried out in such a way that the output stream of observations (values of the output parameters of the CPS in the UTG nodes) is formed with a minimum delay (the value of such a delay can be determined in advance) relative to the stream (i.e., the input stream), but at the same time that all observations of the CPS parameters, except for lagging or early (i.e., being an incident), were classified as on time and reported to the calculator 430. Based on the above, the lowest possible value can be additionally defined for Ds (by default or during the calibration phase), e.g., 2 or 3.

The unloading criterion is at least one of the following:

- flow unloading: between the UTG node for which the possibility of unloading is checked and the head unit of the UTG, there is such a number of other UTG nodes that is equal to or exceeds the unloading distance along the flow Ds, thus, the criterion of inflow unloading is met by the UTG node and the UTG nodes preceding it in time, H−Ds·p(H−(Ds+1)·p etc.), where (H−(Ds+2)·pH is the headnode of the UTG, p is the period of the UTG;
- timeout unloading: The time elapsed from the previous processing time, during which the UTG node for which the unloading capability is being checked, was recognized as the UTG head node, to the processing time (current) equal to or greater than the Dt timeout, so that Node H was recognized as the UTG head node at the time of processing Th, then it will be unloaded at the timeout when the current processing time is equal to or greater than the value Th+Dt.

It should be noted that if the possibility of unloading at least two UTG nodes is checked, and if the flow unloading criterion is met for one UTG node, and the timeout unloading criterion is met for another UTG node, then the one of the specified UTG nodes with a larger timestamp is selected.

In a preferred aspect, all UTG nodes following the last unloaded node up to and including the UTG node that satisfies the unloading criterion are additionally unloaded.

In one aspect, in step 508, an incident (e.g., "late observation", "source clock failure", or "loss of flow") is further generated if at least one of the incident generation conditions is met:

- for the "late observation" incident: the time of the observation data of the CPS parameter corresponds to the previously unloaded UTG node;
- for the "source clock failure" incident: the time of the observation data of the CPS parameter is ahead of the label time of the head unit of the UTG for a specified time interval;
- for a "loss of flow" incident, if the CPS parameter is no longer receiving observations for a certain amount of time specified for the CPS parameter, and the incident information is additionally added to the value of the output CPS parameter.

In yet another aspect, the method of FIG. 5 further includes steps 520-521.

In optional step 520, method 500 determines whether or not properties 411 of the stream need to be redefined. In one aspect, the properties of the stream are determined as needing to be redefined in the event that the frequency of incidents related to late observations or failed source clock exceeds a specified threshold. In another aspect, the properties 411 of the stream are defined in the event that either a stream begins to arrive or an arrival of the stream resumes after an interruption or after a "loss of flow" incident. The need to define/override the properties of the stream 411 is checked in step 520 based on information received from the DPMS 110 when the stream processor 400 is called in step 501. When the properties of the stream need to be redefined, the method proceeds to step 521. When the properties of the stream do not need to be redefined, the method proceeds to step 502. In optional step 521, method 500 redefines the properties of the stream and proceeds to step 502.

In one aspect, in step 508, when the set of input parameters of the CPS coincides with the set of output parameters of the CPS, a value for each FS parameter from the set of output parameters of the CPS is computed at each of the unloaded nodes, depending on the number of observations of the corresponding input parameter of the CPS assigned to the UTG node:

A) if one or more observations have been accumulated for the input parameter of the CPS in the specified UTG node, the aggregation is performed based on the accumulated observations of the input parameter of the CPS in the specified UTG node; and B) if none of the observations have been accumulated for the CPS parameter in the specified UTG node, the missing value of the CPS parameter is imputed based on the observations of the CPS parameter for earlier UTG nodes.

In another aspect, at step 508, the value of the output CPS parameter at the UTG node is calculated as a function of the associated CPS parameters, and the values for each CPS parameter are calculated depending on the number of observations of the specified CPS parameter assigned to the UTG node as follows:

A) if one or more observations have been accumulated in the specified UTG node for the specified CPS parameter, the calculation of the value of the output CPS parameter at the UTG node comprises aggregating the observations based on accumulated observations of the CPS parameter in the specified UTG node or in earlier UTG nodes or in the specified UTG node and earlier UTG nodes;

B) if none of the observations are accumulated in the specified UTG node for the CPS parameter, the calculation of the value of the output CPS parameter at the UTG node comprises imputing the missing CPS parameter value based on the CPS parameter observations for the earlier UTG nodes, or based on the previously calculated values of the CPS parameter for earlier UTG nodes, or based on a combination of the CPS parameter observations and previously calculated CPS parameter values for earlier UTG nodes.

In the special case, the value of the output parameter of the CPS in the UTG node is additionally calculated based on the values of other output or other input parameters of the CPS associated with the specified output parameter of the CPS (hereinafter referred to as the intermediate parameters).

In this example, the value of the CPS intermediate parameter is calculated, and then the value of the output parameter CPS is calculated based on its associated FS parameters from the set of input parameters of the CPS, as well as based on the intermediate parameter of the CPS. For example, the input parameters of the CPS are the parameters A2, A3, A4, A6. The output parameter of the CPS is the parameter A30, which depends on the parameters A2, A3, A4 according to the following dependence: A30=F(A20, A6), where F is the moving average of the values of the parameters A20, A6 in the previous nodes of the UTG. However, in order to calculate the value of the parameter A30, it is first necessary to calculate the value of the intermediate parameter A20 according to its dependence on the parameters A2, A3, A4, which is determined by the formula: A20=G(A2, A3, A4), where G is the average value of the parameters A2, A3, A4 in the current UTG node. Thus, the method of the present disclosure makes it possible to use any dependencies of the output parameters of the CPS on the input parameters of the CPS, including the use of intermediate parameters of the CPS.

A break in the flow of the CPS parameter is a situation when no observations of this CPS parameter have been received for the UTG node at the time of its unloading. There are two types of discontinuity: flow interruption and "flow loss".

A flow interruption is a gap that has occurred due to the loss of one or a small (below a certain value) number of observations of the CPS parameter, or due to the fact that the intrinsic period of formation of observations of the CPS parameter is greater than the UTG period. The interruption of the stream is not associated with any change in the behavior of the monitored object.

In one aspect, in step 508, the calculator 430 does not attempt to interpret the interruption of the thread in a special way, but simply compensates for the gap by imputation (e.g., by repeating the last known value of the CPS parameter, or the average of the last few values of the CPS parameter).

In a particular aspect, in step 508, the calculator 430 also similarly fills in the flow gap of the output parameter of the CPS, i.e., by imputation (e.g., by repeating the last computed (i.e., the value of the output parameter of the CPS, or the average of the last few computed values of the output parameter of the CPS).

In some scenarios, the interruption of the receipt of observations may be longer term. The term "loss of flow" is used to refer to a long-term (within a certain time interval specified for the CPS parameter, or the loss of such a number of CPS parameter observations that exceeds a certain value) interruption of the receipt of CPS parameter observations, which can be caused by a shutdown of the monitored object (or its part) or an accident in the data transmission network. In view of the fact that the "loss of flow" indicates a significant change in the state of the observed system.

In step 508, the calculator 430 handles the "loss of flow" in a special manner, as described below.

In one aspect, when the "loss of flow" occurs, the calculator 430 generates a special "loss of data" (LoD) incident and/or sets the default value for the specified CPS parameter for the specified CPS parameter at the UTG nodes, starting with the UTG node where the "loss of flow" was identified. In a particular aspect, the calculator 430 treats the "loss of flow" of the CPS output parameter in the same way, that is, it sets the default value for the CPS output parameters that are associated with the CPS parameter whose stream was lost.

In one aspect, discontinuities in the flows of one or more CPS parameters do not create a special situation for the storage device 420 as long as at least one observation of any CPS parameter is received for each UTG node. Observations from other CPS parameters allow UTG nodes to be unloaded by flow (if the flow is dense) or by timeout (if the flow is sparse), and therefore the calculator 430 is called to process these UTG nodes.

In another particular aspect, when a simultaneous flow break occurs, a "standstill" state occurs for all CPS parameters.

A complete flow stop condition is diagnosed by the storage device 420 when the following conditions are met simultaneously:

a) storage device 420 determined that the node to be unloaded is N;

b) the head node of the UTG precedes or is equal to the node to be unloaded: H≤N. This means that the input stream has not arrived for some time and the node N unloaded by timeout; and c) the timeout queue is empty (i.e., the node N was last in line).

In one aspect, in order to identify the processing of the "loss of flow" of observations of the CPS parameters in the event of a complete flow stoppage, a mechanism is provided for transmission of a certain number of empty UTG nodes "by inertia" in the stream processor 400. This mechanism is called afterlife. When the storage device 420 enters a state of complete flow stoppage, it simultaneously enters rundown mode, wherein the duration of the rundown in the UTG nodes is specified in the settings of the stream processor 400.

In the run-down mode, the storage device 420 requests the DPMS 110 to call itself at regular processing intervals corresponding to the run-down period Da. The run-down period can be calculated at the time of transition to run-down mode as follows: while processing the input stream, the stream processor 400 remembers the processing time intervals between the recognitions of adjacent UTG head nodes for a given number (e.g., 10 or 20) of the last recognized UTG head nodes. The run-down period Da is assumed to be equal to the given percentile (e.g., 75% or 90%) of these intervals. Thus, the run-down is performed approximately at the speed of the data time passage relative to the processing time that was observed before the flow stoppage, and the run-down period Da approximately corresponds to the UTG period measured in the processing time, with upward correction. The correction is needed to reduce the risk that the rundown will outpace the data time. In the run-down mode, the run-out timeout of the node is actually assumed to be equal to Da, and the head node of the UTG does not change. The time velocity of the data relative to the processing time is the ratio of the difference between the data times of the two observations to the difference between the time of arrival of these observations in the storage device 420, measured by the processing hours (i.e., the processing time of these observations, see the detailed description of FIGS. 9A-10D). At the same time, the specified velocity can be measured both between two adjacent observations and between two observations lagging behind by a certain time interval.

Each time it is in the rundown mode, the storage device 420 places another UTG node in the unloading queue by timeouts at the time of T_now+Da, where T_now is the current moment of processing time, and, accordingly, unloads the previous UTG node by timeout, which in this case may turn out to be completely empty. Unloading even a completely empty UTG node at step 507 initiates a call to the calculator 430 to process this UTG node at step 508. Therefore, the calculator 430 is able to impute or identify "loss of flow" those FSC parameters for which such actions are configured.

The rundown duration is not less than the number of UTG nodes required by the calculator 430 to identify and process the "loss of flow" of all CPS parameters for which such actions are configured.

A "standstill" state is made upon receipt of any observation related to the UTG Z node located in the future relative to the current UTG head node H (Z>H), and the Z node is immediately recognized as the new head node of the UTG. When the flow is exited, several nodes can be unloaded at the same time (which may be referred to as "flush unloading") up to node Z exclusively (i.e., node Z will not be unloaded), which, depending on the current state of the rundown process, may include full or partial run-down completion (up to node min(H+a×p, Z−p), where "a" represents the configured rundown duration, "p" represents the UTG period) and/or the omission of empty nodes located between the last possible run-down node (or node H, if the run-down is not configured) and node Z. Skipping nodes means that the nodes are considered unloaded, but are not fed to the calculator 430 because their processing will be unproductive: the "loss of flow" state has already been identified and processed at the run-down stage, after which the empty nodes do not carry any useful information. Thus, if nodes are skipped, the next UTG node after the last possible rundown node (or the last non-empty node D: H≤D<Z, if the rundown is not configured), which will be unloaded into the calculator and for which, accordingly, the values of the output parameters of the CPS will be generated, will be the node Z, which will be unloaded in due time in a normal way, that is, by flow or by timeout.

Thus, the declared method of bringing an arbitrarily distributed flow of observations of CPS parameters coming in real time to the UTG makes it possible to solve the stated technical problem and achieve the declared technical results, which consist in bringing an arbitrarily distributed flow of observations of the CPS parameters received in real time to the UTG. The technical results are achieved: in reducing the time of bringing an arbitrarily distributed flow of observations of CPS parameters received in real time to the UTG (for example, in comparison with the conversion of observations of historical data to the UTG, when it is necessary to wait for the formation of such a data set before starting to bring them to the UTG); in formation of the flow of values of the output parameters of the CPS converted to the UTG without gaps; as well as in preparation of data in a format and volume necessary for correct operation of the anomaly detectors and the predictive analyzers.

In step 510, method 500 returns results to the DPMS 110. That is, the stream processor 400 returns results to the DPMS 110. The returned results will not contain the output values of the CPS at the UTG nodes, but may contain the estimated timing of subsequent calls to the stream processor 400.

In one aspect, in step 510, the returned results may further be transmitted to anomaly detector 200 and predictive analyzer 300.

In step 511, method 500 detects anomalies via the anomaly detector 200, as described in conjunction with FIG. 6.

In step 512, method 500 performs predictive analysis via the predictive analyzer 300, as described in conjunction with FIG. 7.

FIG. 6 illustrates an example of a method 600 for detecting anomalies in the CPS in real time in accordance with aspects of the present disclosure.

In step 601, method 600 obtains a real-time randomly distributed stream of observations of the CPS parameters.

In step 602, when at least one of the call conditions is met, method 600 converts the CPS observation stream to the UTG using a stream processor 400 according to the method described in FIG. 5.

In step 603, method 600 detects at least one anomaly in the CPS based on the UTG output values using at least one anomaly detector 200.

In one aspect, the call conditions include at least one of the following:

at least one new CPS parameter observation has been received from the stream.

arrival of the predetermined points in time.

Detectors from the detector list 200 implement at least one of the following methods for detecting anomalies:

a) a method according to which an anomaly is detected in the event that the overall forecast error exceeds the threshold value, while the values of the output parameters of the CPS are preliminarily predicted and the total forecast error for the output parameters of the CPS is determined;

b) a method by which an anomaly is detected by applying a machine learning model to the values of the output parameters of the CPS;

c) the way in which an anomaly is detected when an anomaly detection rule is executed;

d) a method according to which the anomaly is detected on the basis of comparison of the obtained values of the output parameters of the CPS with the limit values of the established ranges of values for the output parameters of the CPS; and e) assembling the results of the work in at least one of the above ways.

The above implementation of the detector 200 is not intended to prevent other implementations. Thus, the above description is not exhaustive, and the features of the present disclosure may be implemented in various ways without diverting from aspects of the present disclosure.

Thus, the stated method in FIG. 6 allows you to solve the stated technical problem and achieve the previously listed method for the method according to FIG. 5 technical results. In addition, another technical result is achieved, which consists in improving the quality of anomaly detection in the CPS by bringing an arbitrarily distributed flow of observations of CPS parameters received in real time to the UTG and identifying anomalies in the values converted to the UTG the output parameters of the CPS, and the high quality includes, in particular, a low number of errors of the first and second kind, a reduction in the time for detecting anomalies.

FIG. 7 illustrates an example of a method 700 for performing predictive analysis in the CPS in real time in accordance with aspects of the present disclosure.

In step 701, method 700 receives a real-time randomly distributed stream of observations of the CPS parameters.

In step 702, when at least one of the call conditions is met, method 700 converts the stream of observations of the CPS parameters to the UTG using the stream processor 400, for example using the method of FIG. 5.

In step 703, using predictive analyzers 300, method 700 performs predictive analysis of output values of the parameters of the CPS converted to the UTG.

In one aspect, the call conditions include at least one of the following:

at least one new CPS parameter observation has been received from the stream; and one of the predetermined points in time has arrived.

Thus, method 700 allows one to solve the stated technical problem and achieve the previously listed goals. In addition, another technical result is achieved, which consists in improving the quality of the predictive analysis of the CPS parameters by bringing an arbitrarily distributed stream of observations of the CPS parameters received in real time to the UTG and performing a predictive analysis. The high quality includes, in particular, the high accuracy of predicting the values of one or more output parameters of the CPS over a long period of time.

Figure 8:
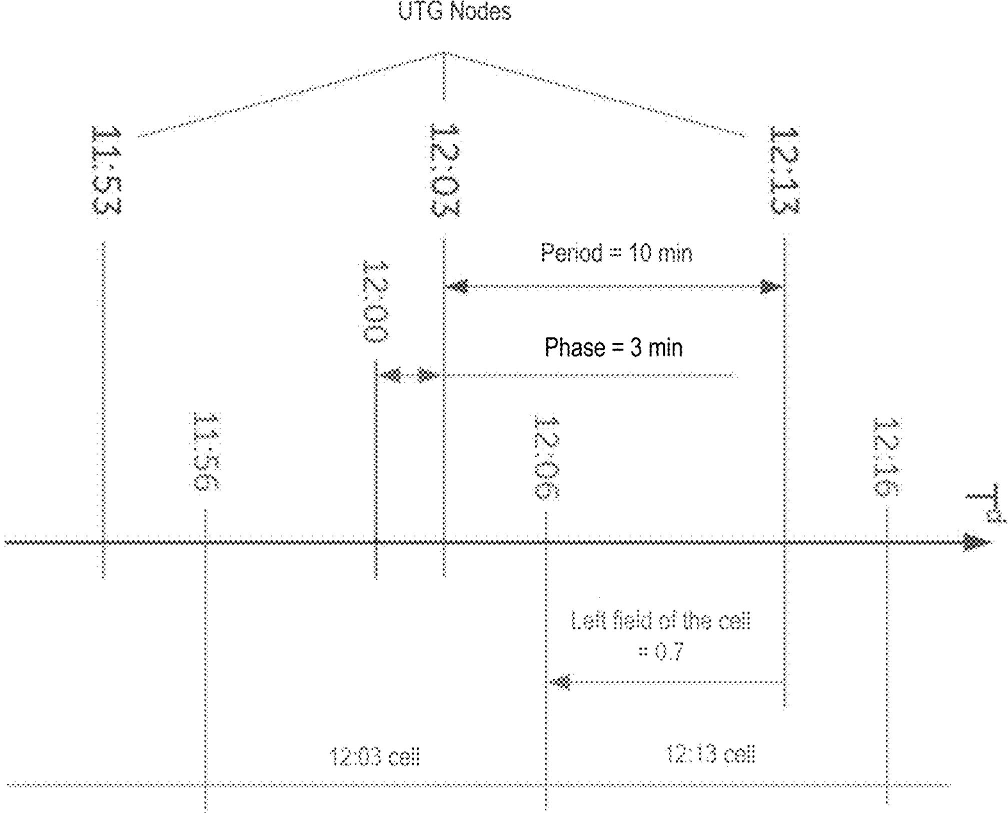
FIG. 8 illustrates a block diagram of an exemplary UTG in accordance with aspects of the present disclosure.

FIG. 8 illustrates a block diagram of an exemplary UTG 800 in accordance with aspects of the present disclosure.

FIGS. 9A-9D show examples of the flow of observations of CPS parameters. Hereinafter, the processing time ($T^p$) is deferred along the abscissa axis, and the data time ($T^d$) is deferred along the ordinate axis. The UTG is defined in the time of the data and, accordingly, the timestamps of the corresponding UTG nodes (t1, t2, etc.) are also plotted on the ordinate axis. On the graphs, circles of different shades correspond to observations of different CPS parameters.

Figure 9A:
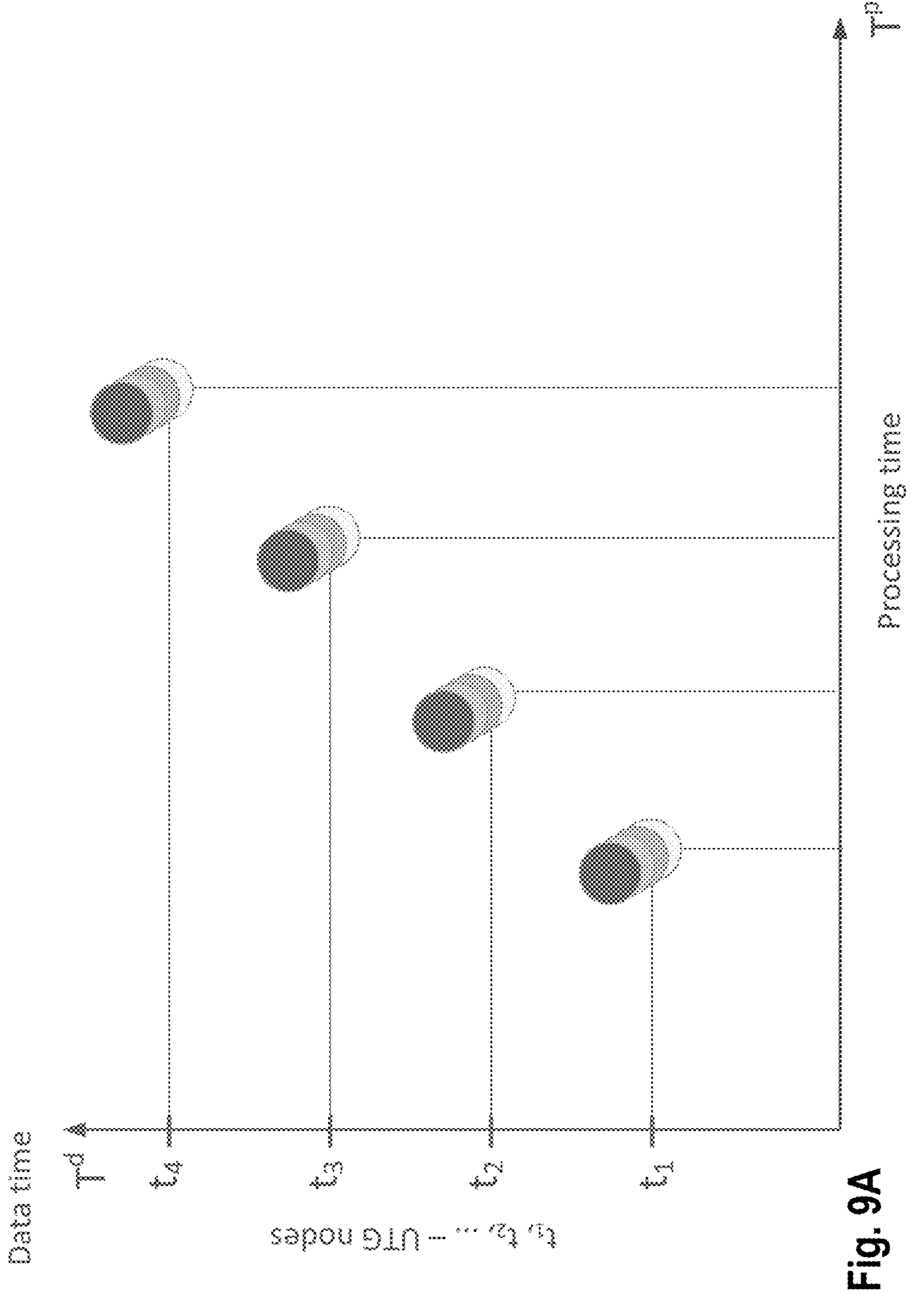
FIG. 9A illustrates an example of a flow of observation of CPS parameters in accordance with aspects of the present disclosure.

FIG. 9A illustrates an example of a ideal flow of observation of CPS parameters in accordance with aspects of the present disclosure. Such a flow is characterized by the following conditions:

a) the values of all CPS parameters are measured at the monitoring object at the same time;

b) the values of the CPS parameters are measured exactly in the UTG nodes, i.e. the data time exactly corresponds to the timestamp of the UTG node;

c) the values of the CPS parameters are measured at each UTG node;

d) the values of the CPS parameters taken from the monitored object at the same time are delivered to the stream processor 400 together (as one set of observations); and e) delay of delivery of each batch of CPS parameter observations from the monitored object to the stream processor 400 is the same, and the speed of the data time flow relative to the processing time is constant. Delivery latency can be measured as the time interval between data time and processing time.

It is worth noting that in real CPS, the ideal flow shown in FIG. 9*a*, is practically impossible. Related to this is the stated technical problem. Monitoring and processing of the telemetry stream almost always involve data transmission networks and multi-component systems, including DPMS 110, in which the absence of delivery delay (condition e) cannot be guaranteed due to technical limitations. Other conditions (a-d) are not met at different sites in different combinations.

Figure 9B:
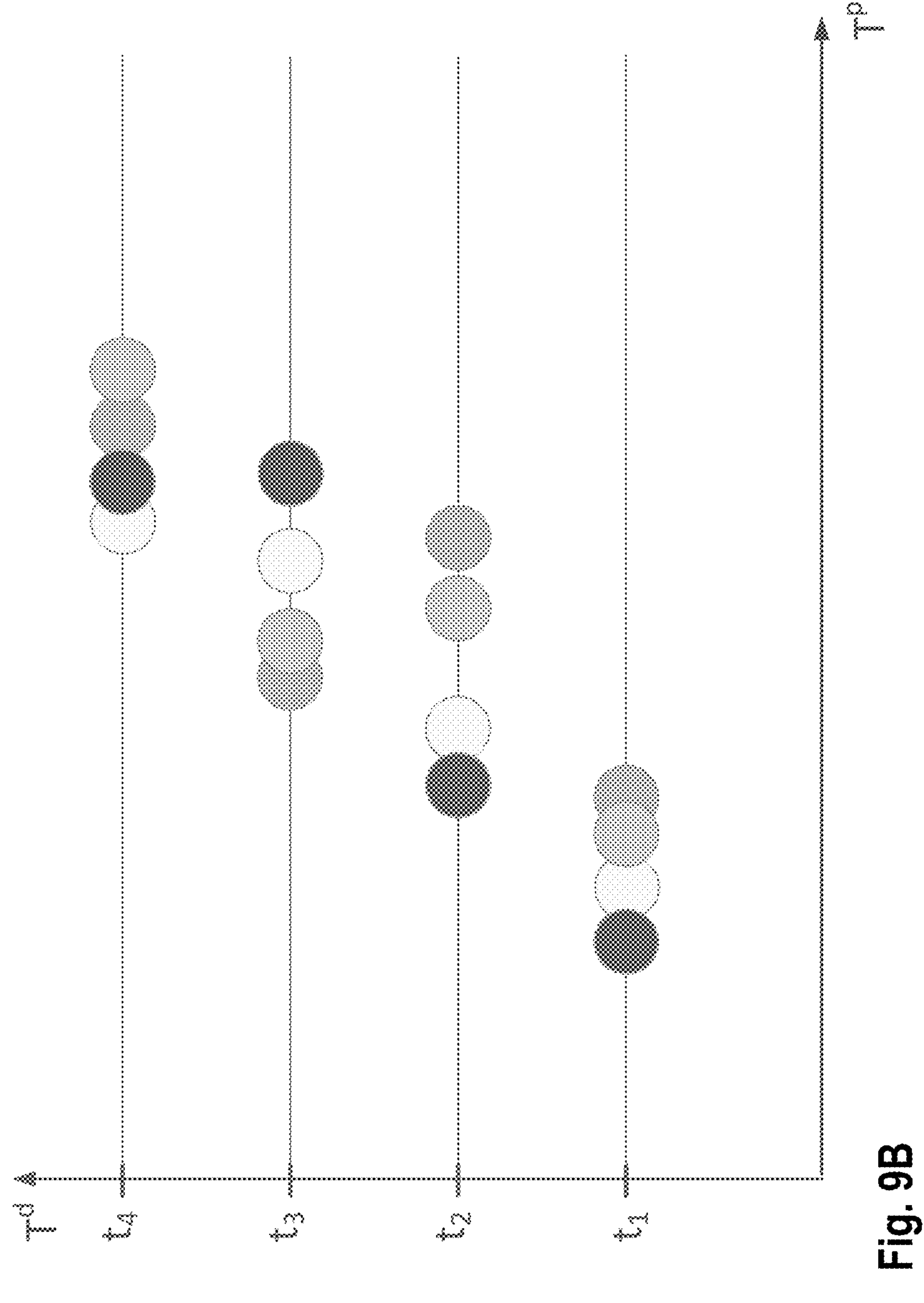
FIG. 9B illustrates an example of a flow of observation of CPS parameters in which flow disruption exists due to the jitter of the arrival delay of the CPS observations in accordance with aspects of the present disclosure.

FIG. 9B illustrates an example of a flow of observation of CPS parameters in which flow disruption exists due to the jitter of the arrival delay of the CPS observations in accordance with aspects of the present disclosure. For example, at time t1 and t2, the observation of the first CPS parameter (dark circle with respect to the data time) came first among the observations of all four CPS parameters, while at the time of the data t3, the observation of the first CPS parameter came last (the latency increased), and at the time of the data t4 it came second (the delay decreased). The situation is similar with observations of other CPS parameters. In addition, the speed of the data time passage relative to the processing time also varies.

Figure 9C:
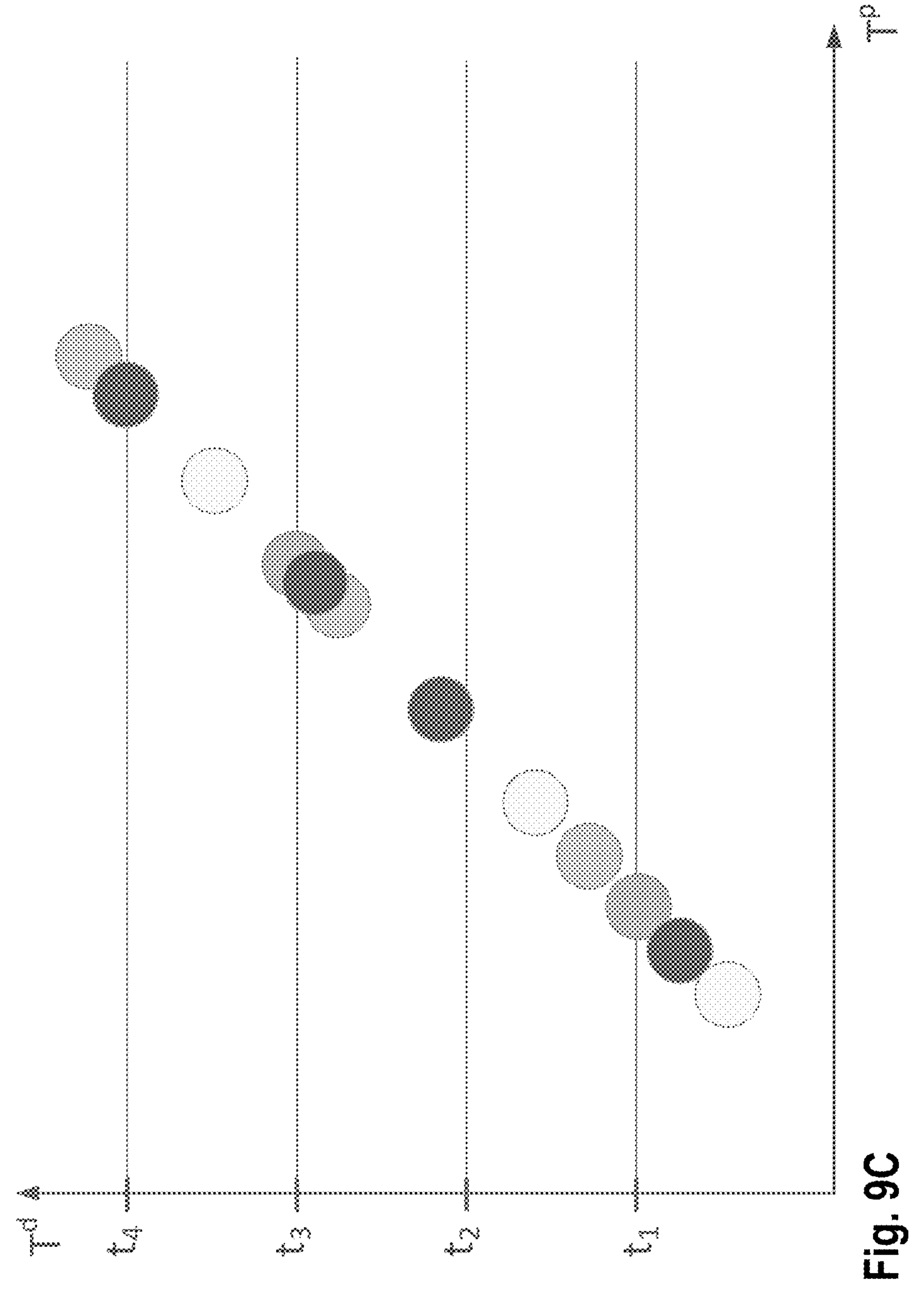
FIG. 9C illustrates an example of a flow of observation of CPS parameters in which the values of the CPS parameters are not measured in the UTG nodes in accordance with aspects of the present disclosure.

FIG. 9C illustrates an example of a flow of observation of CPS parameters in which the values of the CPS parameters are not measured in the UTG nodes in accordance with aspects of the present disclosure. There is no variation in the delay in the arrival of the CPS parameter observations, i.e., the time interval between the data time and the processing time for the CPS parameter observations remains constant, while the data time velocity relative to the processing time also remains constant.

Figure 9D:
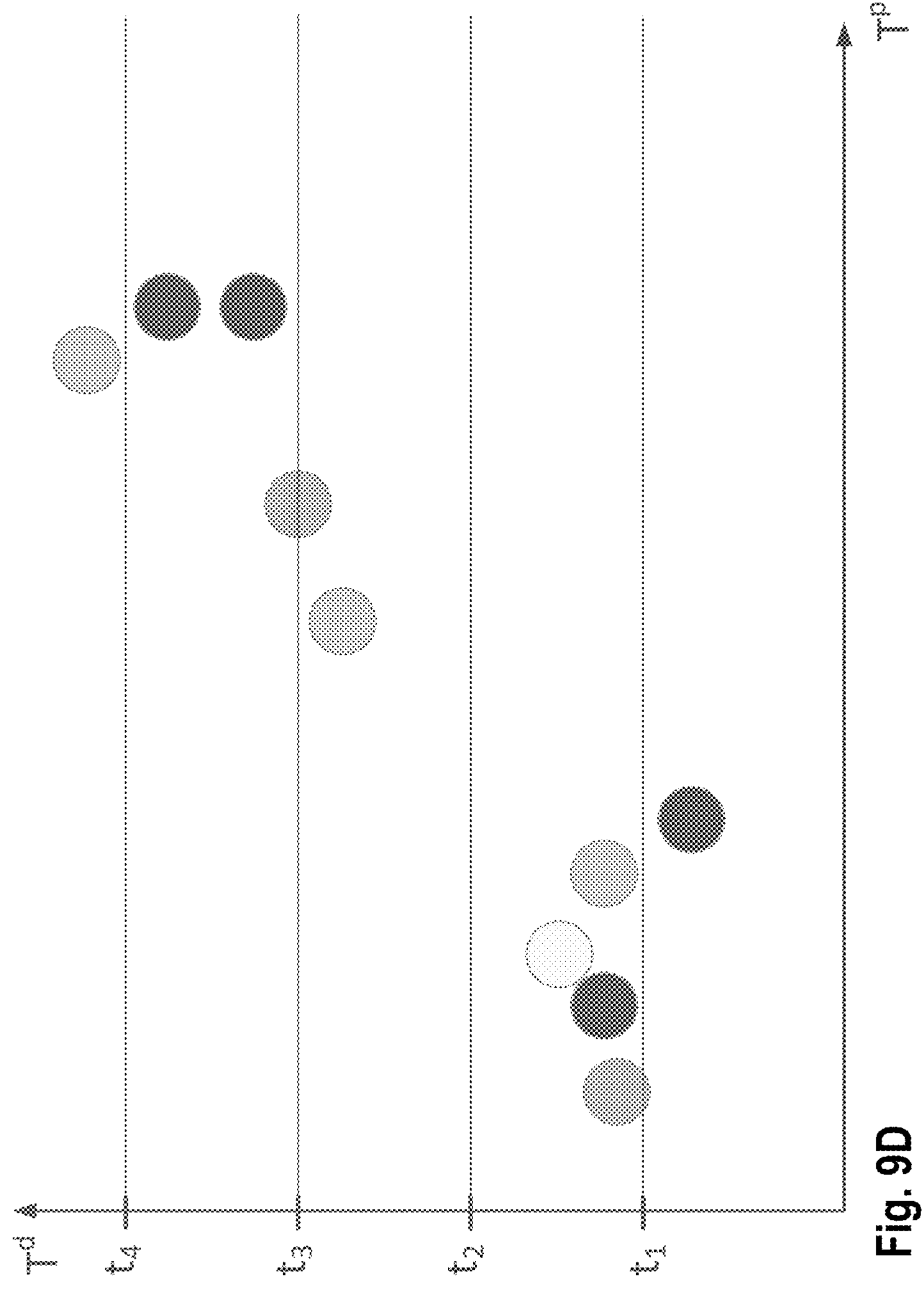
FIG. 9D illustrates an example of a realistic flow of observation of CPS parameters in which none of the ideal flow conditions are satisfied in accordance with aspects of the present disclosure.

FIG. 9D illustrates an example of a realistic flow of observation of CPS parameters in which none of the ideal flow conditions are satisfied in accordance with aspects of the present disclosure.

In addition to the examples in FIG. 9*b*-9*d*, related to the disruption of the data flow, the data flow can also be distorted by the data time velocity relative to the processing time. FIG. 10*a*-10*d* shows examples of changing the time of observations of CPS parameters in the stream. The notations are similar to those in FIG. 9*a*-9*d*. The line illustrates the passage of data time relative to the processing time. The time course of the data is understood as the time corresponding to the current head node of the UTG, which includes the majority of observations of the CPS parameters received at the current time of processing or immediately before it. Accordingly, the change (advancement into the future) of the head node of the UTG reflects the passage of data time in the processing time.

Figure 10A:
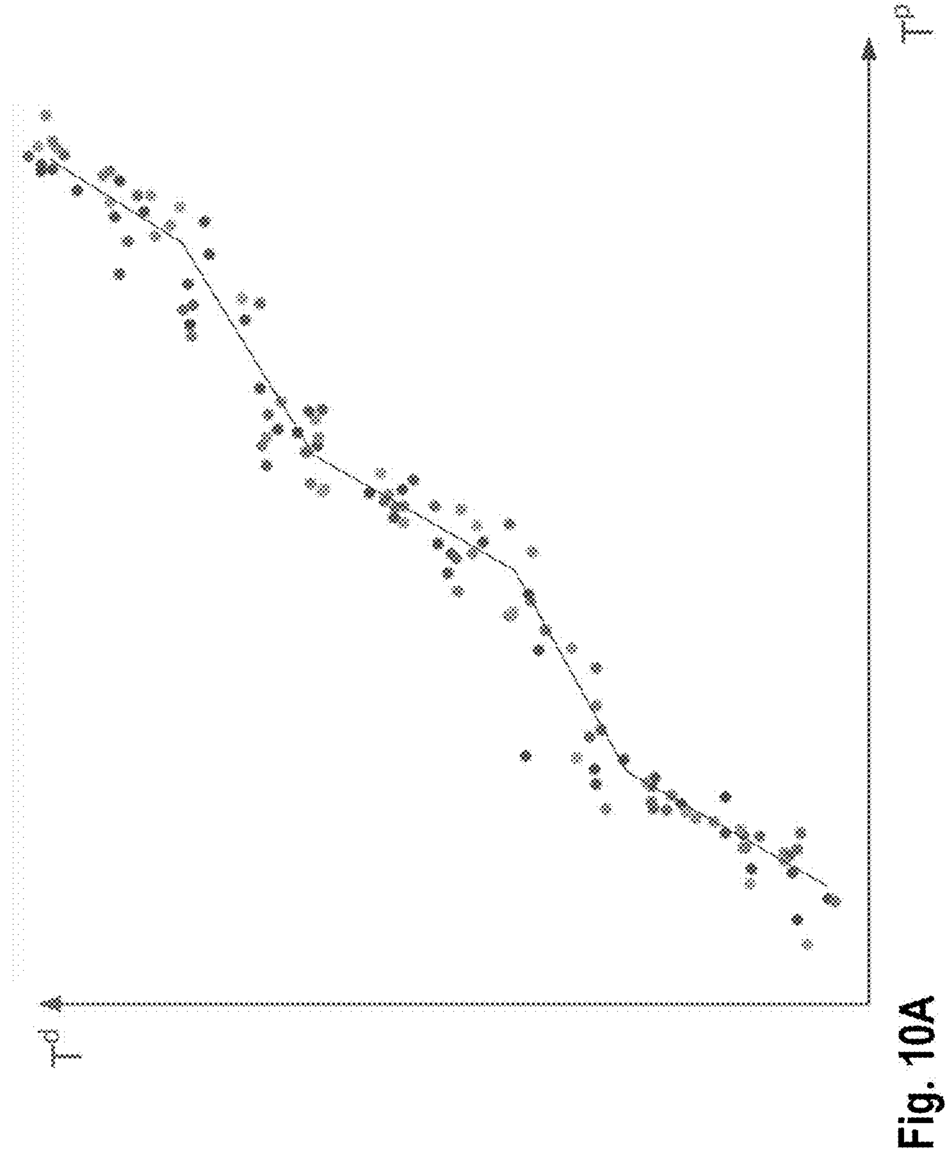
FIG. 10A illustrates an example of time changes in data of observations of CPS parameters in a stream in accordance with aspects of the present disclosure.

FIG. 10A illustrates an example of time changes in data of observations of CPS parameters in a stream in accordance with aspects of the present disclosure. Thus, FIG. 10A shows an example of a fluctuation in the data time velocity relative to the processing time caused by load variations on various systems processing the movement of the CPS parameter observation stream from the monitoring object to the stream processor 400.

Figure 10B:
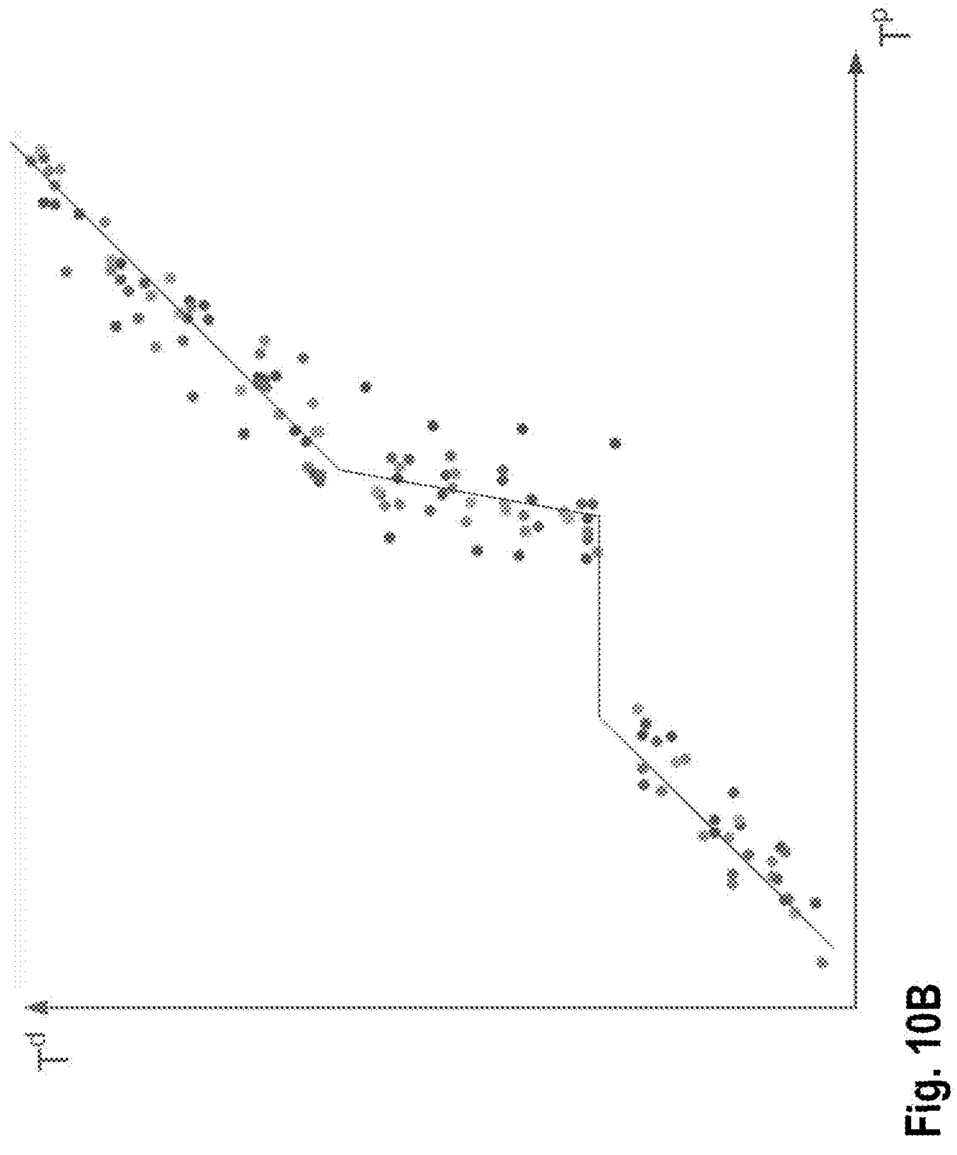
FIG. 10B illustrates an example of time changes in data of observations of CPS parameters in a stream in which the data flow is interrupted in accordance with aspects of the present disclosure.

FIG. 10B illustrates an example of time changes in data of observations of CPS parameters in a stream in which the data flow is interrupted in accordance with aspects of the present disclosure. Thus, FIG. 10B illustrates an example in which the data flow is interrupted (e.g., there is a temporary network outage), after which the monitoring object rapidly sends the accumulated data monitoring of CPS parameters and returns to sending telemetry regularly.

Figure 10C:
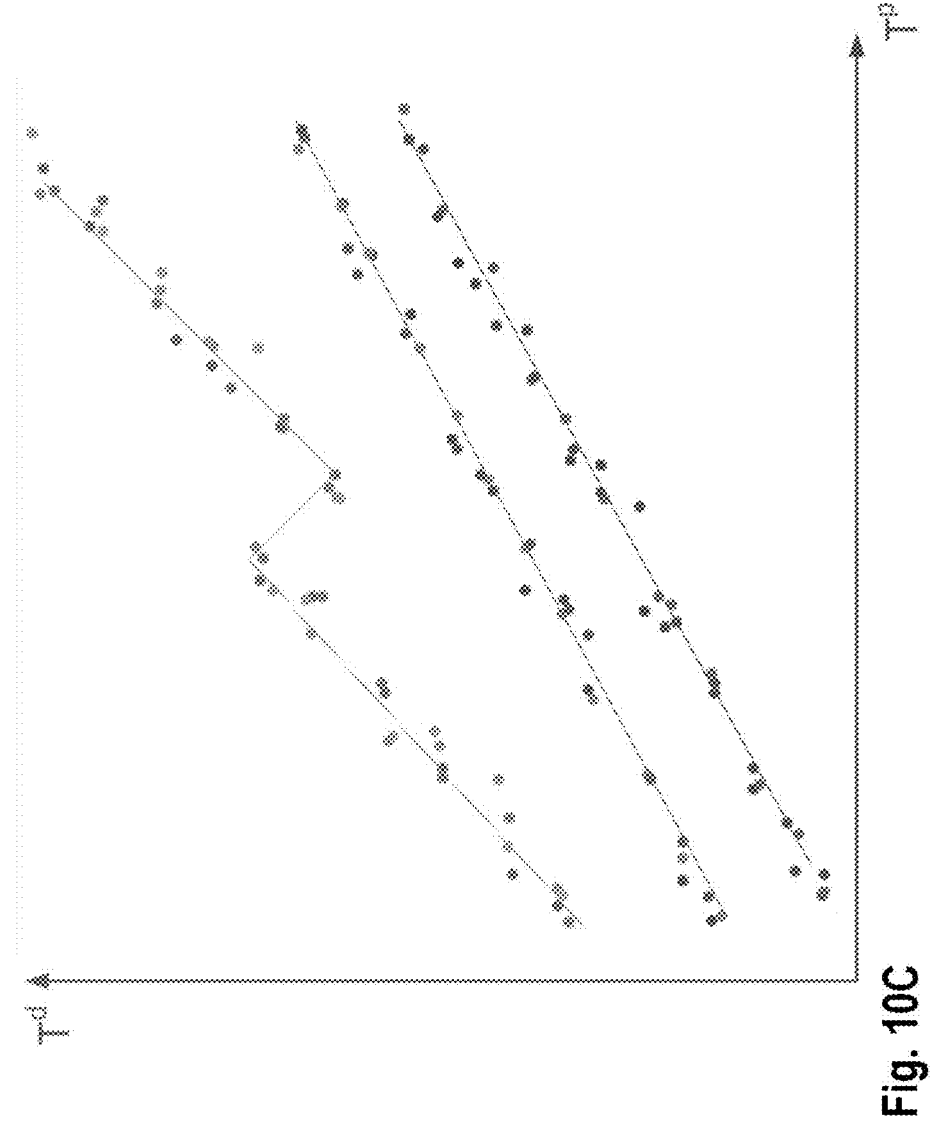
FIG. 10C illustrates an example of time changes in data of observations of CPS parameters of a stream in which different clocks are used in accordance with aspects of the present disclosure.

FIG. 10C illustrates an example of time changes in data of observations of CPS parameters of a stream in which different clocks are used in accordance with aspects of the present disclosure. In FIG. 10C, the data is split into three streams due to the fact that the measurements of the values of the CPS parameters at the monitored object are made with the participation of three different clocks. Observations of the CPS parameters of one stream (one set of CPS parameters) lag behind the observations of the CPS parameters of another stream (another set of CPS parameters) by a constant interval in the time of the data, and observations of the CPS parameters of the third stream (the third set of CPS parameters) go into the future. The data time of this stream is then adjusted, and then the process is repeated.

Figure 10D:
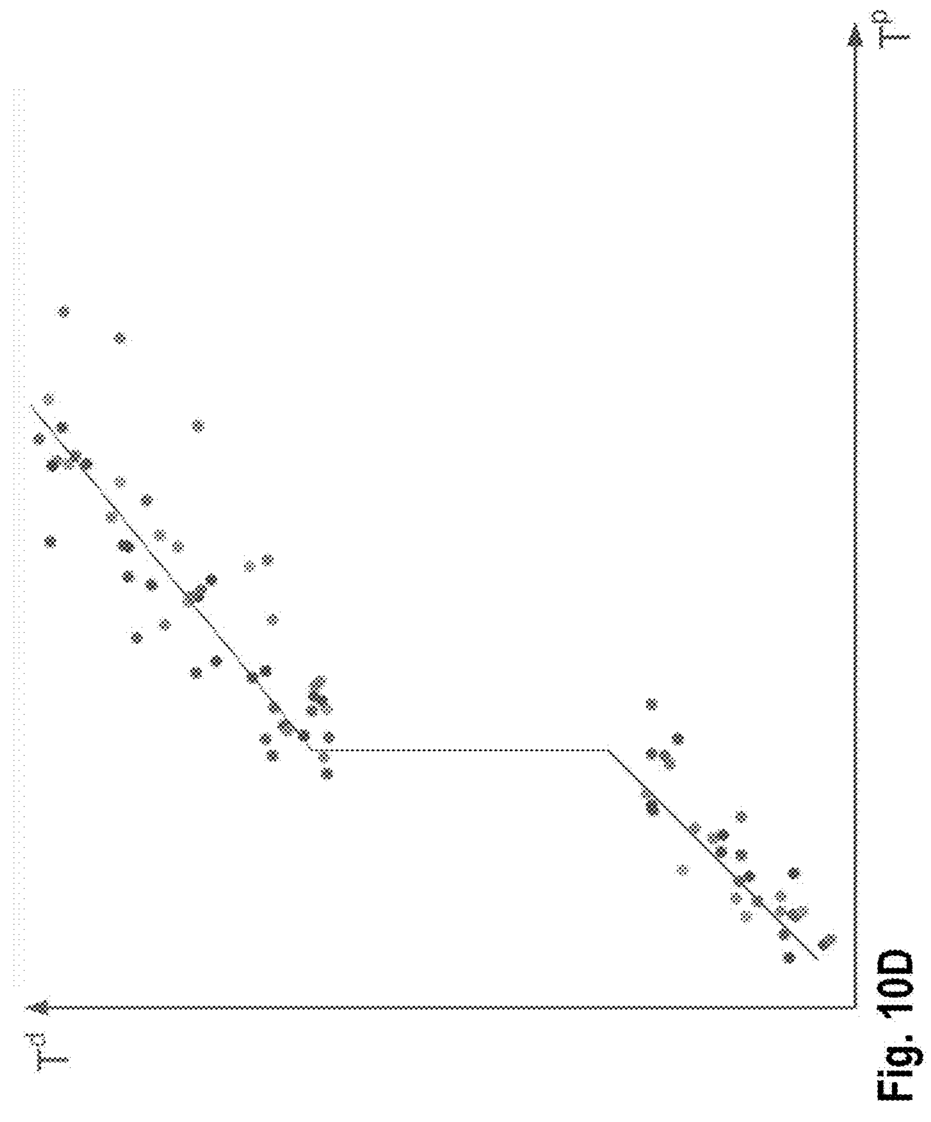
FIG. 10D illustrates an example of time changes in data of observations of CPS parameters in a stream in accordance with aspects of the present disclosure.

FIG. 10D illustrates an example of time changes in data of observations of CPS parameters in a stream in accordance with aspects of the present disclosure. Thus, FIG. 10D illustrates a seemingly impossible situation—a leap in data time into the future. However, this is a very realistic scenario: this could happen when a telemetry source plays a pre-recorded stream that for some reason could not be transmitted to the receiving party (anomaly detector 200 or predictive analyzer 300) in real time, however, the task of detecting anomalies in it or performing predictive analysis is relevant. The stream recording contains long pauses (e.g., corresponding to equipment shutdown intervals) and the telemetry source reduces these pauses to a minimum value in processing time to speed up the process.

Thus, FIGS. 9A-9D, FIGS. 10A-10D show examples of distortion of the flow of observations of CPS parameters, and the method of the present disclosure makes it possible to bring an arbitrarily distributed flow of observations of CPS parameters (including as in the above examples) coming in real time to the UTG, an example of which is presented in FIG. 9A, thus solving the stated technical problem.

Figure 11:
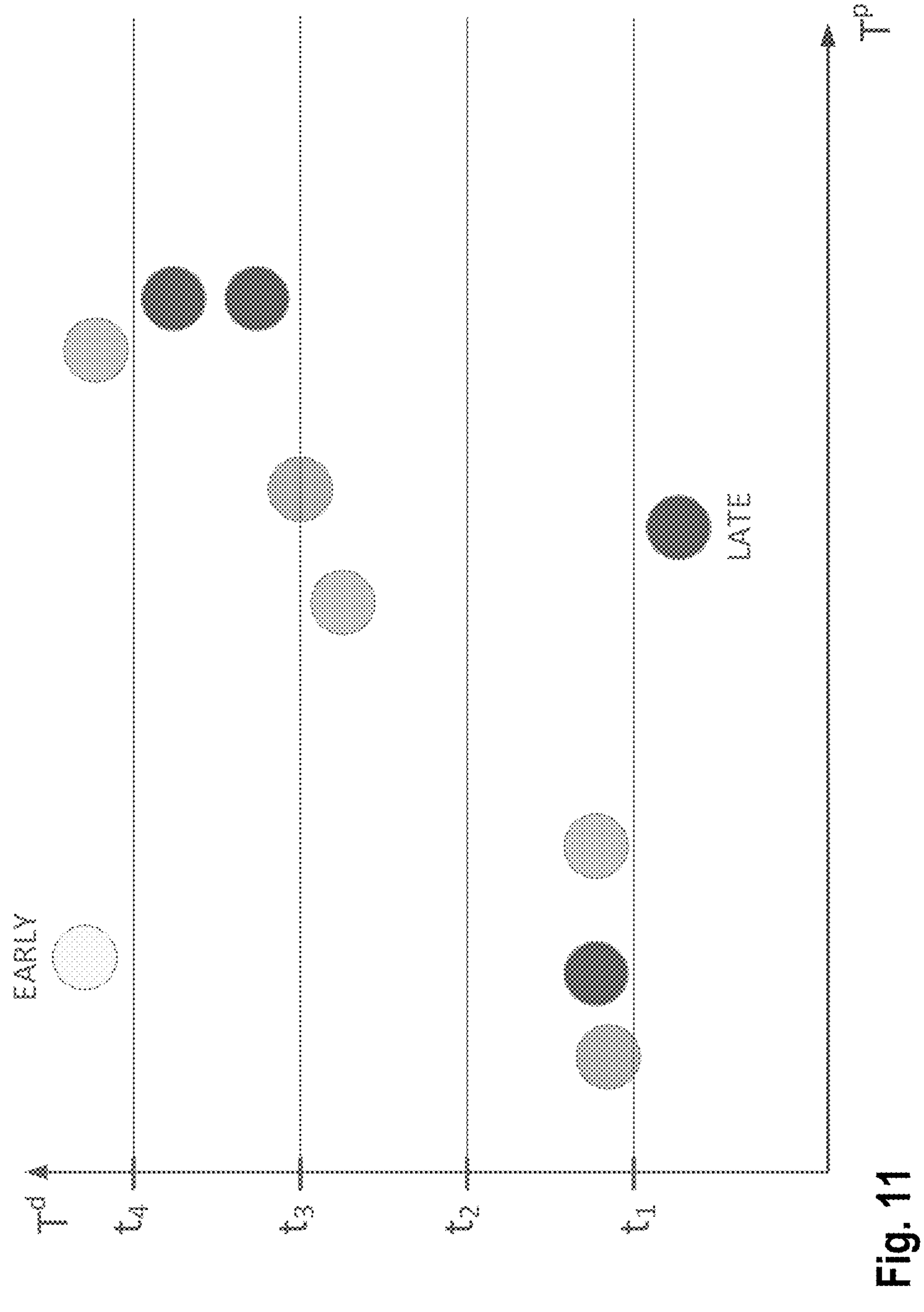
FIG. 11 illustrates an example of observations of CPS parameters indicating an incident in the data in accordance with aspects of the present disclosure.

FIG. 11 illustrates an example of observations of CPS parameters indicating an incident in the data in accordance with aspects of the present disclosure.

It should be noted that the time of the data is the reading of the clock running on the computers of the monitored object (for example, CPS), which is not necessarily synchronized with the true physical time. It may well turn out that the time of the data of individual observations of the CPS parameters does not correspond to the true time of the creation of these observations of the CPS parameters due to various delays and inaccuracies that may arise in the computer system engaged in the formation of observations of the CPS parameters on the side of the monitored object. In general, the difference between the time of the data and the true time of the observed process can vary randomly. In some instances, the stream processor 400 may determine that the source clock is running incorrectly, e.g., when an observation of the CPS parameter has been received with time of data from the future relative to the time of the main volume data received at a given time in the processing time of the CPS parameter observations. Such observations may be labeled early, and the calculator 430 at step 508 may not compute the values of those output parameters of the CPS that depend on the input parameters of the CPS in the specified early observations. At the same time, when such early observations of the CPS parameters are obtained, a "source clock failure" incident will be created, because the timing of the data of such observations of the CPS parameters cannot be correct. The causes of such incidents cannot always be stopped automatically and require investigation by a specialist.

On the other hand, the occurrence (or increase in the frequency of occurrence) of late observations of CPS parameters, whose data time significantly lags behind the time of the data of the main volume of observations of CPS parameters received at the moment, is not necessarily a sign that the monitoring object's clock is lagging behind the true time. The increase in the delay in the delivery of CPS parameter observations can be explained by a variety of other reasons related to the functioning of intermediate agents. In order to reduce the number of late observations of the CPS parameters, the stream processor 400 may be configured to automatically recalibrate the storage device 420 (override thread properties 411, Ds, Dt parameters) and activate if the frequency of late values of the FSC exceeds a specified threshold. If the recalibration does not have an effect, an investigation by a specialist may be required. Calibration of the storage device 420 is carried out in such a way that the output stream of observations (the values of the output parameters of the CPS in the UTG nodes) is generated with a minimum delay relative to the stream (i.e., the input stream), but at the same time that all observations of the CPS parameters, except for lagging or early (i.e., incidental) observations, are classified as coming on time and are transmitted to the calculator 430. This will make it possible to solve the specified technical problem and achieve the stated technical results.

In other cases, i.e., when observations of the CPS parameters cannot be qualified as early or late, the stream processor 400 and data consumers (anomaly detectors 200, predictive analyzers 300) may assume that the data time corresponds to the true physical time of the process observed at the monitored object.

Figure 12:
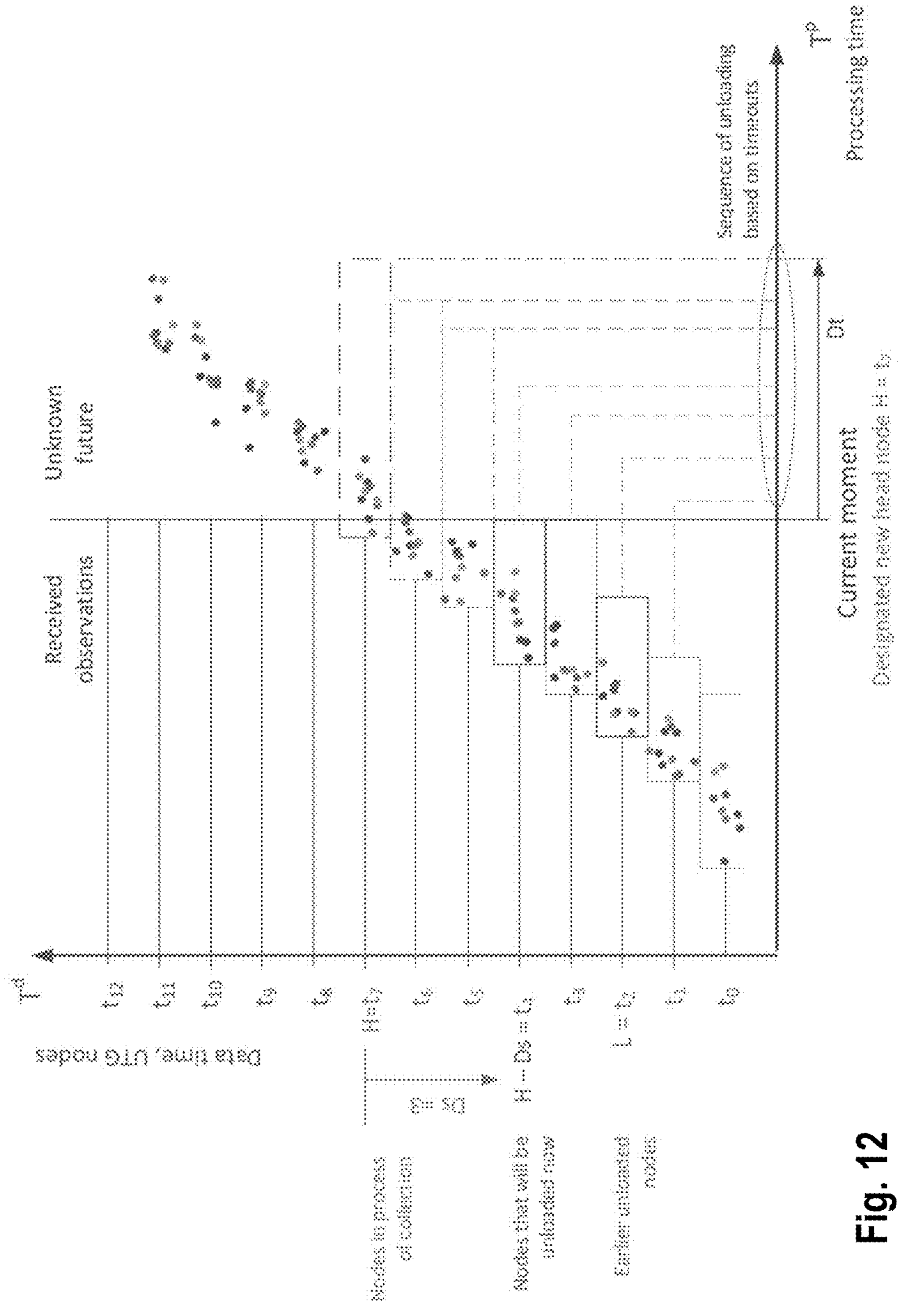
FIG. 12 illustrates an example of the method of stream processor using an exemplary dense stream of observations of CPS parameters in accordance with aspects of the present disclosure.

FIG. 12 illustrates an example of the method of stream processor using an exemplary dense stream of observations of CPS parameters in accordance with aspects of the present disclosure.

The current moment in time of processing is shown by a vertical line. The stream processor 400, being called at this point upon the arrival of one of the observations of the CPS parameters related to node 7, decides to recognize node 7 as the head node of the UTG. As a consequence, taking into account the fact that Ds=3, node 4 is subject to upstream unloading. Since the last unloaded node of the UTG is node 2, then nodes 3 and 4 will actually be unloaded. Nodes 5, 6 and the head node of UTG 7 will continue to accumulate observations of CPS parameters.

Rectangular frames for each UTG node correspond to the time of accumulation of observations of CPS parameters by data clock (height of the vertical side of the frame) and by processing hours (length of the horizontal side of the frame). Vertically, the accumulation time corresponds to the cell of the UTG node, and horizontally, it represents the interval between the arrival at the processor of the first observation of the CPS parameter related to this node and the moment of unloading the node.

Upon recognition of the head node of UTG 7, the moment of unloading of this node is also set according to the timeout, which is located in the future at the distance Dt from the current moment in the processing time. This moment is added to the timeout queue—a list of UTG nodes and their corresponding processing time moments, when the corresponding node should be unloaded by timeout. In this example, nodes 5 and 6 are already in the timeout queue. Nodes 5-7 are unloaded, either by thread or by timeout, stream processor 400 is currently unknown (they will be unloaded at the time of processing, when one or another unloading criterion is met); the corresponding frames are shown by a dotted line.

As for the previously unloaded nodes, FIG. 12 shows that they were unloaded via the stream: for example, node 2 was unloaded at the moment of recognition of the head node of UTG 5. Technically, nodes 1-4 are still in the timeout shipping queue, but these items will be removed from the queue as the processing time progresses.

Figure 13:
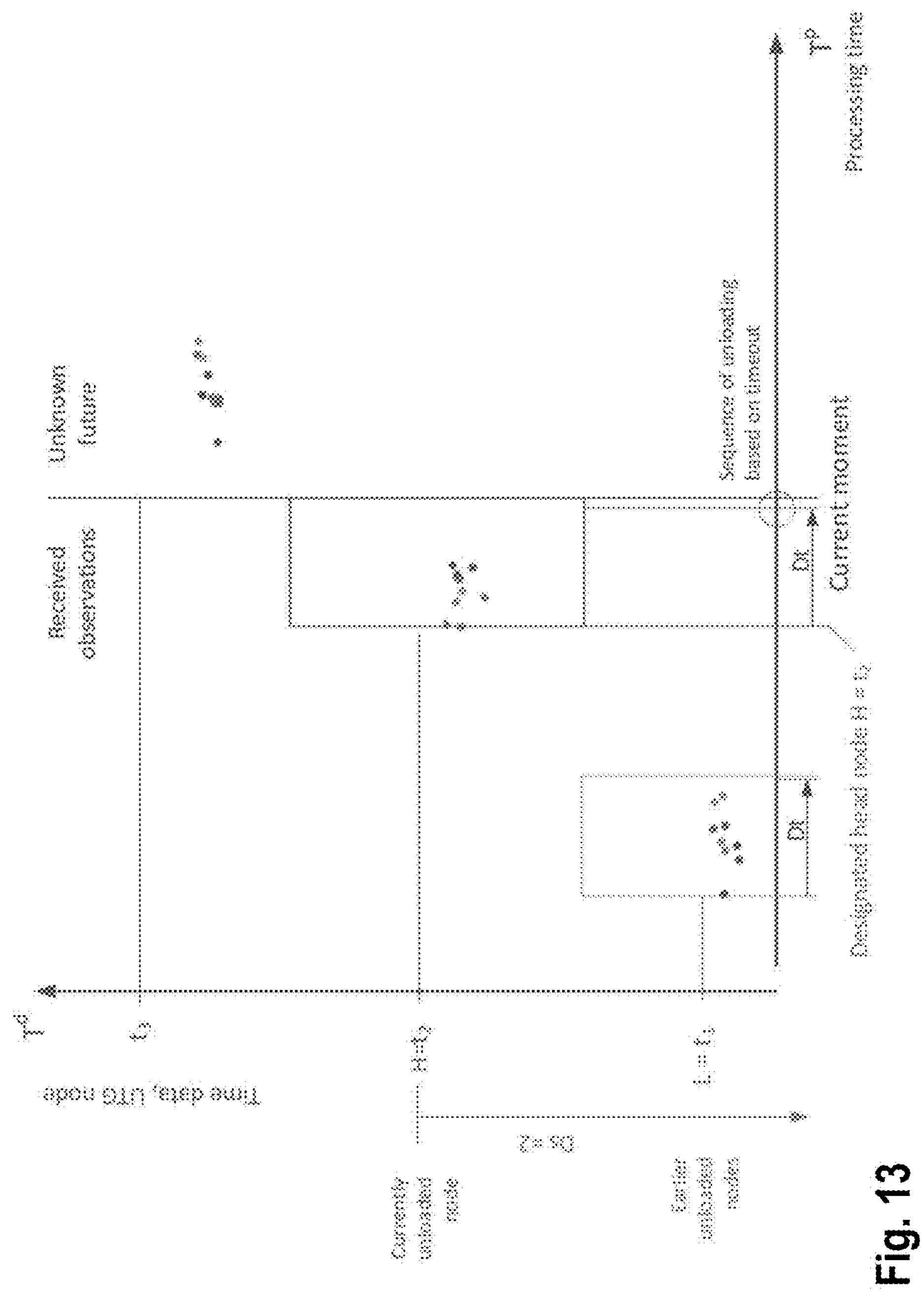
FIG. 13 illustrates an example of the method of stream processor using an exemplary sparse stream of observations of CPS parameters in accordance with aspects of the present disclosure.

FIG. 13 illustrates an example of the method of stream processor using an exemplary sparse stream of observations of CPS parameters in accordance with aspects of the present disclosure.

In this example, the data flow is sparse. At the current time in the processing, the stream processor 400 has been called in time. The recommended call time for the stream processor 400 was set earlier at the time when Node 2 was recognized by the head node of the UTG as the time when Node 2 should be unloaded at the Dt timeout. In fact, the DPMS 110 made a call to the stream processor 400 a little later than the appointed time, which is quite acceptable.

At the time of the call, the storage device 420 detects that no new observations of the CPS parameters have been received and therefore node 2 remains the head node of the UTG. The unloading distance along the stream Ds is 2, i.e., node 0, which has been unloaded for a long time, is subject to unloading along the stream, since the last unloaded node is L=1. Inspecting the timeout unload queue, storage device 420 finds a single node 2 in it; Its unloading time has already arrived, but it has not yet been unloaded. Thus, as a result of the call to stream processor 400, node 2 will be unloaded at this time.

It can be seen that in a sparse flow, the decision to unload a node by timeout is systematically made before the decision to unload the same node by flow would have been made. If node 2 were unloaded downstream, this event would have to wait until node 4 was recognized as the head node of the UTG.

Returning to FIG. 5 and FIG. 6, in one aspect, a method for detection of anomalies in a cyber-physical system comprises: obtaining, in real-time, randomly distributed stream of observations of CPS parameters, when at least a call condition is met, converting an observation of the CPS parameter to a uniform temporal grid (UTG), when at least a criterion for unloading at least one UTG node of the converted observations is satisfied, unloading the UTG nodes corresponding to the satisfied criterion, for each unloaded UTG node, calculating, for each output parameter of an CPS of a set of output parameters of the CPS, output values of the CPS parameters for the respective unloaded UTG node, and detecting an anomaly in the CPS based on the output values of the CPS parameters.

In one aspect, the at least one call condition includes at least one of the following: at least one new observation of the CPS parameter has been received from the stream; and one point in time of a set of predetermined points in time has arrived.

In one aspect, using at least one anomaly detector, at least one of the following anomaly detection methods is implemented: a method according to which an anomaly is detected in an event that an overall forecast error exceeds a threshold value, while output values of the CPS parameters of the CPS are preliminarily predicted and a total forecast error for the output values of the CPS parameters is determined; a method by which an anomaly is detected by applying a machine learning model to the output values of the CPS parameters; a method in which an anomaly is detected when an anomaly detection rule is executed; a method according to which an anomaly is detected based on a comparison of the output values of the CPS parameters with limit values of previously established ranges of values for the output values of the CPS parameters; and a method of combining results of two or more of the above methods.

In one aspect, for the stream, the properties of a flow unloading include at least one of the following: a flow unloading distance, and a timeout.

In one aspect, the flow unloading criteria include at least one of: a property for unloading distance along the stream that specifies a number of UTG nodes to which values of the output parameters of the CPS can be assigned; and a property for timeout unloading that specifies a processing time interval that determines a maximum waiting time for receipt of the values of the CPS parameters from the stream.

In one aspect, when the criteria for unloading at least two UTG nodes is satisfied, the flow unloading criterion is met for one UTG node, and the timeout unloading criterion is met for another UTG node, then, selecting, from among the at least two UTG nodes for which the criteria for unloading is satisfied, a particular UTG node having a greatest timestamp as the UTG node.

In one aspect, the one or more other UTG nodes are additionally unloaded sequentially preceding the UTG node that satisfies the criterion for unloading.

In one aspect, in the event that an observation of at least one CPS parameter relates to the unloaded UTG node, said at least one observation of the CPS parameter is also unloaded.

In one aspect, in the event that at least one observation of the input parameter of the CPS associated with the output parameter relates to the UTG node, the at least one observation of the input parameter is taken into account when calculating the output values of the CPS parameters.

In one aspect, the method further comprises performing the following steps subject to an arrival of at least one new observation of the CPS parameters from the stream; accumulating each received observation of the CPS parameter and assigning to the UTG node in accordance with a time of observation of the respective observation; for each received observation of the CPS parameter, checking at least one criterion for a recognition of a new head node of the UTG; and when at least one criterion for the recognition of the new head node is satisfied, recognizing the UTG node corresponding to the time of observation of the CPS parameter corresponding to the satisfied criterion as the head node of the UTG.

In one aspect, the criterion for recognition of the head node of the UTG comprises one of: a criterion for recognition by a representation; a criterion for recognition by a proportionality of an interval; and a criterion for recognition in a state of complete flow stoppage.

In one aspect, the method further comprises: when at least one condition for generating an incident is satisfied, generating an incident.

In one aspect, the conditions for the generating of the incident include at least one of the following: a condition for a "late observation" incident being a time of the observation of the data of the CPS parameter corresponding to a previously unloaded UTG node; a condition for a "source clock failure" incident being a time of the observation of the data of the CPS parameter being ahead of the timestamp of the head node of the UTG by a predetermined time interval; and a condition for a "loss of flow" incident, the incident being based on having the CPS parameter being no longer receiving observations for a predetermined amount of time specified for the CPS parameter, and information of the incident having being additionally added to the output parameters of the CPS.

In one aspect, the method further comprises: when a frequency of occurrence of "late observation" or "source clock failure" incidents exceeds a specified threshold, overriding the properties of the stream.

In one aspect, the method further comprises: if a set of input parameters of the CPS coincides with the set of output parameters of the CPS, then in each of the unloaded nodes of the UTG, calculating a value for each parameter of the CPS from the set of output parameters of the CPS depending on a number of observations of corresponding set of input parameters of the CPS assigned to the UTG node, and if one or more observations are accumulated in the UTG node for the set of input parameters of the CPS, aggregating the set of input parameters of the CPS in the UTG node based on the one or more accumulated observations.

In one aspect, the method further comprises: when a set of input parameters of the CPS coincides with the set of output parameters of the CPS, and none of the observations are accumulated in the unloaded UTG node for the CPS parameter, imputing missing values of the CPS parameter based on observations of the CPS parameter for earlier UTG nodes.

In one aspect, the values of the output parameters of the CPS in the UTG node is calculated according to dependence on associated CPS parameters; for each CPS parameter, the values of the output parameters are calculated depending on a number of observations of the CPS parameter attributed to the UTG node; for each CPS parameter, one or more observations are accumulated in the UTG node for the CPS parameter; and the aggregation is performed based on the one or more accumulated observations of the CPS parameter in the UTG node, in an earlier UTG node, or in both the UTG node and the earlier UTG node.

In one aspect, the output values of the CPS parameters of in the UTG node are calculated according to dependence of the associated CPS parameters, wherein, when no observation has been accumulated in the unloaded UTG node for at least one related CPS parameter, and the method further comprises: imputing a missing value of the CPS parameter based on one of: observations of the CPS parameter for earlier UTG nodes, previously calculated values of the CPS parameter for the earlier UTG nodes, and a combination of observations of the CPS parameter and previously computed output values of the CPS parameter for earlier UTG nodes.

In one aspect, the calculation of the output values of the CPS parameters of the UTG node is further based on values of other output or other input parameters of the CPS associated with the the output parameter of the CPS.

In one aspect, the method further comprises determining properties of the flow during a start of the flow or a resumption of the flow after an interruption.

FIG. 14 is a block diagram illustrating a computer system 20 on which aspects of systems and methods for detection of anomalies in a cyber-physical system in real-time may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 14 above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detection of anomalies in a cyber-physical system (CPS) in real-time, the method comprising: obtaining, in real-time, a stream of randomly distributed of observations of one or more CPS parameters; converting the observations of the one or more CPS parameters to a uniform temporal grid (UTG) comprising a plurality of UTG nodes;

in response to at least one criterion for unloading at least one UTG node of converted observations is satisfied, unloading the at least one UTG node corresponding to the at least one criterion for unloading;

for each unloaded UTG node, calculating a value of each output CPS parameter of a set of output CPS parameters to produce values of the output CPS parameters for that unloaded UTG node; and detecting an anomaly in the CPS based on the values of the output CPS parameters.

2. The method of claim 1, wherein converting the observations to the UTG is performed responsive to at least one call condition selected from:

at least one new observation of the CPS parameter has been received from the stream; and a point in time of a set of predetermined points in time has arrived.

3. The method of claim 1, wherein detecting an anomaly in the CPS includes one of:

in response to an overall forecast error exceeds a threshold value, while the values of the output CPS parameters are preliminarily predicted and a total forecast error for the values of the output CPS parameters is determined;

applying a machine learning model to the values of the output CPS parameters;

in response to an anomaly detection rule is executed;

based on a comparison of the values of the output CPS parameters with limit values of previously established ranges of the values for the output CPS parameters; and combining results of two or more of the above methods.

4. The method of claim 1, wherein, for the stream, properties of unloading include at least one of the following: a flow unloading distance, and a timeout.

5. The method of claim 4, wherein the at least one criterion for unloading include at least one of:

a property for unloading distance along the stream that specifies a number of UTG nodes to which the values of the output CPS parameters can be assigned; and a property for timeout unloading that specifies a processing time interval that determines a maximum waiting time for receipt of the values of the CPS parameters from the stream.

6. The method of claim 5, wherein, in response to criteria for unloading at least two UTG nodes are satisfied, the at least one criterion for unloading is met for one UTG node, and a timeout unloading criterion is met for another UTG node, then, selecting, from among the at least two UTG nodes for which the criteria for unloading are satisfied, a particular UTG node having a greatest timestamp as the UTG node to be unloaded.

7. The method of claim 1, wherein one or more other UTG nodes are additionally unloaded sequentially preceding the UTG node that satisfies the criterion for unloading.

8. The method of claim 1, wherein, in the event that an observation of at least one CPS parameter relates to the unloaded UTG node, the observation of at least one CPS parameter is also unloaded.

9. The method of claim 8, wherein, in the event that the at least one observation of the CPS parameter associated with the output CPS parameter relates to the UTG node, the observation of at least one CPS parameter is taken into account in response to calculating the value of the output CPS parameters for the corresponding output CPS parameter.

10. The method of claim 9, further comprising performing the following steps subject to an arrival of at least one new observation of the CPS parameters from the stream:

accumulating each received observation of the CPS parameter and assigning to the UTG node in accordance with a time of observation of the respective observation;

for each received observation of the CPS parameter, checking at least one criterion for a recognition of a new head node of the UTG; and in response to at least one criterion for the recognition of the new head node of the UTG is satisfied, recognizing the UTG node corresponding to the time of observation of the CPS parameter corresponding to the at least one criterion for the recognition of the new head node of the UTG.

11. The method of claim 10, wherein the at least one criterion for recognition of the new head node of the UTG comprises one of: a criterion for recognition by a representation; a criterion for recognition by a proportionality of an interval; and a criterion for recognition in a state of complete flow stoppage.

12. The method of claim 10, further comprising: in response to at least one condition for generating an incident is satisfied, generating an incident.

13. The method of claim 12, wherein conditions for generating the incident include at least one of the following:

a condition for a late-observation incident being a time of observation data of a CPS parameter corresponding to a previously unloaded UTG node;

a condition for a source-clock-failure incident being a time of CPS parameter data being ahead of a timestamp of the head node of the UTG by a predetermined time interval; and a condition for a loss-of-flow incident, the incident being based on having the CPS parameter no longer receiving observations for a predetermined amount of time specified for the CPS parameter, and information of the incident being additionally added to the output parameters of the CPS.

14. The method of claim 13, further comprising:

in response to a frequency of occurrence of late-observation or source-clock-failure incidents exceeds a specified threshold, overriding the properties of the stream.

15. The method of claim 9, further comprising:

in response to a set of input parameters of the CPS coincides with the set of output CPS parameters of the CPS, then in each of the unloaded UTG nodes, calculating a value for each parameter of the CPS from the set of output parameters of the CPS depending on a number of observations of a corresponding set of input parameters of the CPS assigned to the UTG node, and in response to one or more observations are accumulated in the UTG node for the set of input parameters of the CPS, aggregating the set of input parameters of the CPS in the UTG node based on the one or more accumulated observations.

16. The method of claim 1, further comprising: in response to a set of input CPS parameters coincides with the set of output CPS parameters, and none of the observations are accumulated in the unloaded UTG node for the CPS parameter, imputing missing values of the CPS parameter based on observations of the CPS parameter for earlier UTG nodes.

17. The method of 15, wherein the values of the output CPS parameters in the UTG node are calculated according to dependence on associated CPS parameters, wherein, for each CPS parameter, the values of the output CPS parameters are calculated depending on a number of observations of the CPS parameter attributed to the UTG node, wherein, for each CPS parameter, one or more observations are accumulated in the UTG node for the CPS parameter, and wherein the aggregating is performed based on the one or more accumulated observations of the CPS parameter in the UTG node, in an earlier UTG node, or in both the UTG node and the earlier UTG node.

18. The method of claim 1, wherein the values of the output CPS parameters in the UTG node are calculated according to dependence of the associated CPS parameters, wherein, in response to no observation has been accumulated in the unloaded UTG node for at least one related CPS parameter, the method further comprises:

imputing a missing value of the CPS parameter based on one of: observations of the CPS parameter for earlier UTG nodes, previously calculated values of the CPS parameter for the earlier UTG nodes, and a combination of observations of the CPS parameter and previously computed output values of the CPS parameter for the earlier UTG nodes.

19. The method of claim 9, wherein the calculating of the values of the output CPS parameters of the UTG node is further based on values of other output or other input CPS parameters.

20. The method of claim 1, further comprising: determining properties of the stream during a start of the stream or a resumption of the stream after an interruption.

21. A system for detection of anomalies in a cyber-physical system (CPS) in real-time, comprising:

at least one memory; and at least one hardware processor coupled with the at least one memory and configured, individually or in combination, to:

obtain, in real-time, a stream of randomly distributed observations of one or more CPS parameters;

convert the observations of the one or more CPS parameters to a uniform temporal grid (UTG) comprising a plurality of UTG nodes;

in response to at least one criterion for unloading at least one UTG node of converted observations is satisfied, unload the at least one UTG nodes node corresponding to the at least one criterion for unloading;

for each unloaded UTG node, calculate a value of each output CPS parameter of a set of output CPS parameters to produce values of the output CPS parameters for that unloaded UTG node; and detect an anomaly in the CPS based on the values of the output CPS parameters.

22. A non-transitory computer readable medium storing thereon computer executable instructions for detection of anomalies in a cyber-physical system (CPS) in real-time, including instructions for:

obtaining, in real-time, a stream of randomly distributed observations of one or more CPS parameters;

converting the observations of the one or more CPS parameters to a uniform temporal grid (UTG) comprising a plurality of UTG nodes;

in response to at least one criterion for unloading at least one UTG node of converted observations is satisfied, unloading the at least one UTG node corresponding to the at least one criterion for unloading;

for each unloaded UTG node, calculating a value of each output CPS parameter of a set of output CPS parameters to produce values of the output CPS parameters for that unloaded UTG node; and detecting an anomaly in the CPS based on the values of the output CPS parameters.

* * * * *